United States Patent
Lee et al.

(10) Patent No.: US 10,484,334 B1
(45) Date of Patent: *Nov. 19, 2019

(54) DISTRIBUTED FIREWALL SECURITY SYSTEM THAT EXTENDS ACROSS DIFFERENT CLOUD COMPUTING NETWORKS

(71) Applicant: Zentera Systems, Inc., San Jose, CA (US)

(72) Inventors: Jaushin Lee, Saratoga, CA (US); Hung Chuen Jason Lee, Palo Alto, CA (US)

(73) Assignee: Zentera Systems, Inc., San Jose, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 15/487,327

(22) Filed: Apr. 13, 2017

Related U.S. Application Data

(63) Continuation-in-part of application No. 14/817,874, filed on Aug. 4, 2015, now Pat. No. 9,634,990, which is a continuation of application No. 14/190,019, filed on Feb. 25, 2014, now Pat. No. 9,130,901.

(60) Provisional application No. 61/769,713, filed on Feb. 26, 2013.

(51) Int. Cl.
*H04L 29/06* (2006.01)
*H04L 29/08* (2006.01)

(52) U.S. Cl.
CPC ...... *H04L 63/0263* (2013.01); *H04L 63/0218* (2013.01); *H04L 63/0245* (2013.01); *H04L 67/10* (2013.01)

(58) Field of Classification Search
CPC ............ H04L 63/0263; H04L 63/0218; H04L 63/0245; H04L 67/10

USPC .......................................................... 726/14
See application file for complete search history.

(56) References Cited

U.S. PATENT DOCUMENTS

| | | |
|---|---|---|
| 5,386,417 A | 1/1995 | Daugherty |
| 6,717,956 B1 | 4/2004 | Fan |
| 6,757,281 B1 | 6/2004 | Irish |
| 6,914,905 B1 | 7/2005 | Yip |

(Continued)

FOREIGN PATENT DOCUMENTS

| | | |
|---|---|---|
| EP | 1443701 A1 | 8/2004 |
| WO | WO 2012130523 | 10/2012 |

OTHER PUBLICATIONS

Cisco, Understanding Issues Related to inter-VLAN Bridging, Sep. 9, 2005, www.cisco.com. 11072.

*Primary Examiner* — William S Powers
*Assistant Examiner* — Aubrey H Wyszynski
(74) *Attorney, Agent, or Firm* — Staniford Tomita LLP

(57) ABSTRACT

An application profile is provided to manage security of an application deployed across two or more cloud computing networks. A user can define in the application profile first and second server groups, a cloud chamber as including the first and second server groups, and a computing flow to the cloud chamber. A firewall rule is generated based on the computing flow. The firewall rule is distributed to the first server group of the cloud chamber. A copy of the firewall rule is distributed to the second server group of the cloud chamber. The first server group is in a first cloud computing network that is provided by a first cloud provider. The second server group is in a second cloud computing network that is provided by a second cloud provider, different from the first cloud provider.

16 Claims, 18 Drawing Sheets

(56) References Cited

U.S. PATENT DOCUMENTS

| | | |
|---|---|---|
| 6,957,274 B2 | 10/2005 | Trace |
| 7,013,345 B1 | 3/2006 | Brown |
| 7,043,757 B2 | 5/2006 | Hoefelmeyer |
| 7,966,388 B1 | 6/2011 | Pugaczewski |
| 8,230,149 B1 | 7/2012 | Long |
| 8,250,642 B2 | 8/2012 | Bartholomy et al. |
| 8,640,218 B2 | 1/2014 | Bartholomy et al. |
| 9,130,901 B2 * | 9/2015 | Lee ............... H04L 63/0218 |
| 9,224,003 B2 | 12/2015 | Andersen |
| 9,240,962 B2 | 1/2016 | Jung |
| 9,253,166 B2 | 2/2016 | Gauda |
| 9,634,900 B2 * | 4/2017 | Zhang ............... G06F 9/54 |
| 2002/0073210 A1 | 6/2002 | Low |
| 2002/0188862 A1 | 12/2002 | Trethewey |
| 2003/0016664 A1 | 1/2003 | MeLampy |
| 2003/0016678 A1 | 1/2003 | Maeno |
| 2003/0043853 A1 | 3/2003 | Doyle |
| 2003/0051169 A1 | 3/2003 | Sprigg |
| 2003/0169726 A1 | 9/2003 | Larsson |
| 2004/0024903 A1 | 2/2004 | Costatino |
| 2004/0047322 A1 | 3/2004 | O'Neill |
| 2004/0059827 A1 | 3/2004 | Chiang |
| 2004/0078485 A1 | 4/2004 | Narayanan |
| 2004/0100951 A1 | 5/2004 | O'neill |
| 2004/0181694 A1 | 9/2004 | Cox |
| 2005/0257264 A1 | 11/2005 | Stolfo et al. |
| 2006/0031472 A1 | 2/2006 | Rajavelu et al. |
| 2007/0019622 A1 | 1/2007 | Alt |
| 2007/0192910 A1 | 8/2007 | Vu |
| 2008/0060055 A1 | 3/2008 | Lau |
| 2008/0165957 A1 | 7/2008 | Kandasamy et al. |
| 2008/0168523 A1 | 7/2008 | Ansari |
| 2008/0276313 A1 | 11/2008 | Kummu et al. |
| 2008/0295114 A1 | 11/2008 | Argade |
| 2009/0006538 A1 | 1/2009 | Risney, Jr. |
| 2009/0016358 A1 | 1/2009 | Lee |
| 2009/0037382 A1 | 2/2009 | Ansari |
| 2009/0264095 A1 | 10/2009 | Khetawat |
| 2010/0037321 A1 | 2/2010 | Oz |
| 2010/0131960 A1 | 5/2010 | Suganthi |
| 2010/0325419 A1 | 12/2010 | Kanekar |
| 2010/0325420 A1 | 12/2010 | Kanekar |
| 2010/0325429 A1 | 12/2010 | Saha |
| 2011/0090911 A1 | 4/2011 | Hao |
| 2011/0162062 A1 | 6/2011 | Kumar |
| 2011/0191442 A1 | 8/2011 | Ovsiannikov |
| 2011/0202609 A1 | 8/2011 | Chaturved |
| 2012/0005724 A1 | 1/2012 | Lee |
| 2012/0084423 A1 | 4/2012 | McGleenon |
| 2012/0124566 A1 | 5/2012 | Federighi et al. |
| 2012/0284770 A1 | 11/2012 | Bartholomy |
| 2012/0290732 A1 | 11/2012 | Suganthi |
| 2012/0307682 A1 | 12/2012 | Johnsen |
| 2013/0091198 A1 | 4/2013 | Yu |
| 2013/0152156 A1 | 6/2013 | Allison |
| 2013/0182604 A1 | 7/2013 | Moreno |
| 2013/0188514 A1 | 7/2013 | Jain |
| 2013/0191883 A1 | 7/2013 | Tung |
| 2013/0198304 A1 | 8/2013 | Jung |
| 2013/0227286 A1 | 8/2013 | Brisson |
| 2014/0068698 A1 | 3/2014 | Burchfield et al. |
| 2014/0068701 A1 | 3/2014 | Burchfield et al. |
| 2014/0122865 A1 | 5/2014 | Ovsiannikov |
| 2014/0136635 A1 | 5/2014 | Jeng |
| 2014/0304409 A1 | 10/2014 | Kamath |
| 2014/0337408 A1 | 11/2014 | Workman |
| 2015/0106489 A1 | 4/2015 | Duggirala |
| 2015/0113279 A1 | 4/2015 | Andersen |
| 2016/0057210 A1 | 2/2016 | DeCusatis |
| 2016/0373304 A1 | 12/2016 | Sharma |
| 2017/0012949 A1 | 1/2017 | Boren |

* cited by examiner

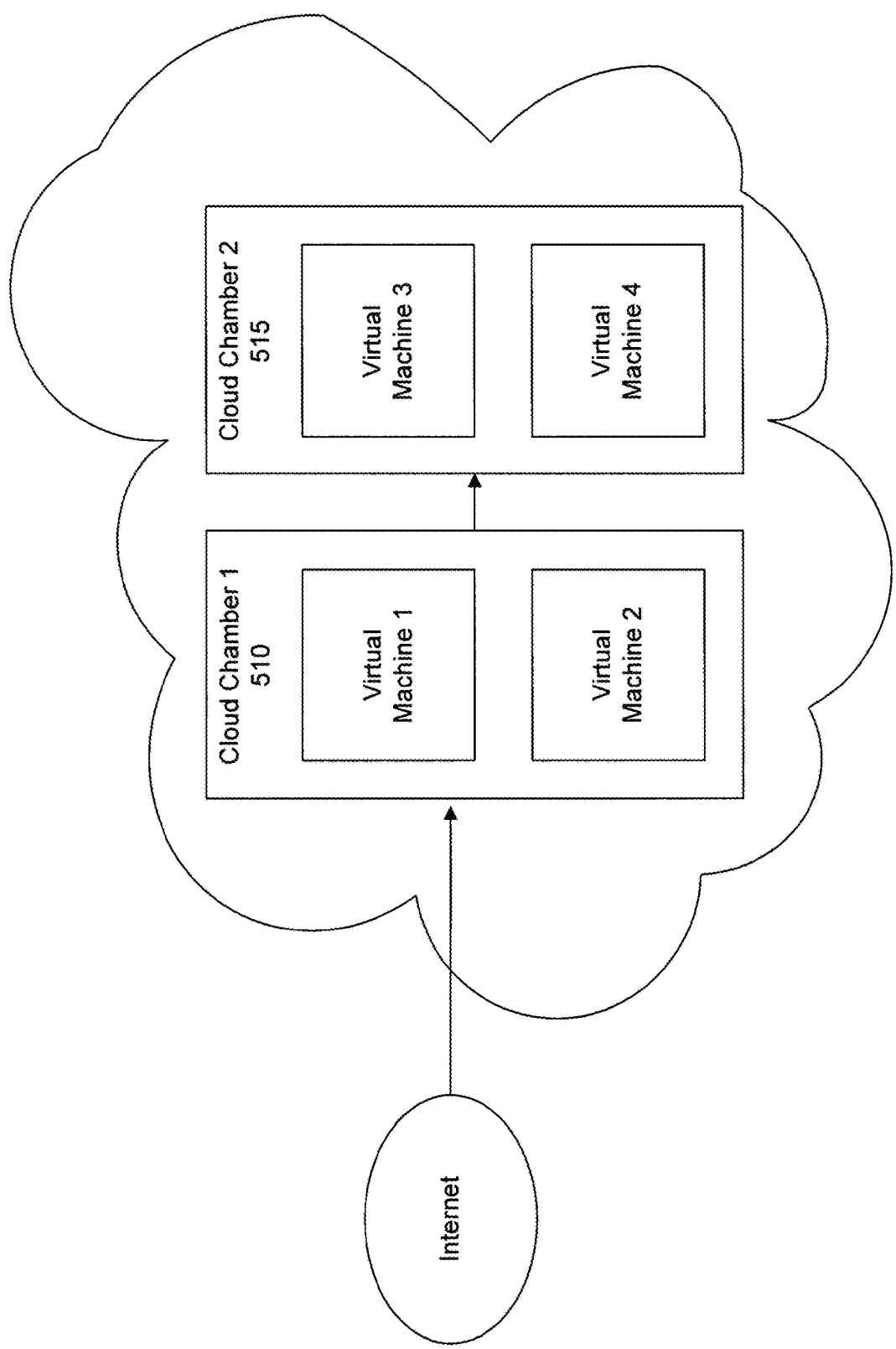

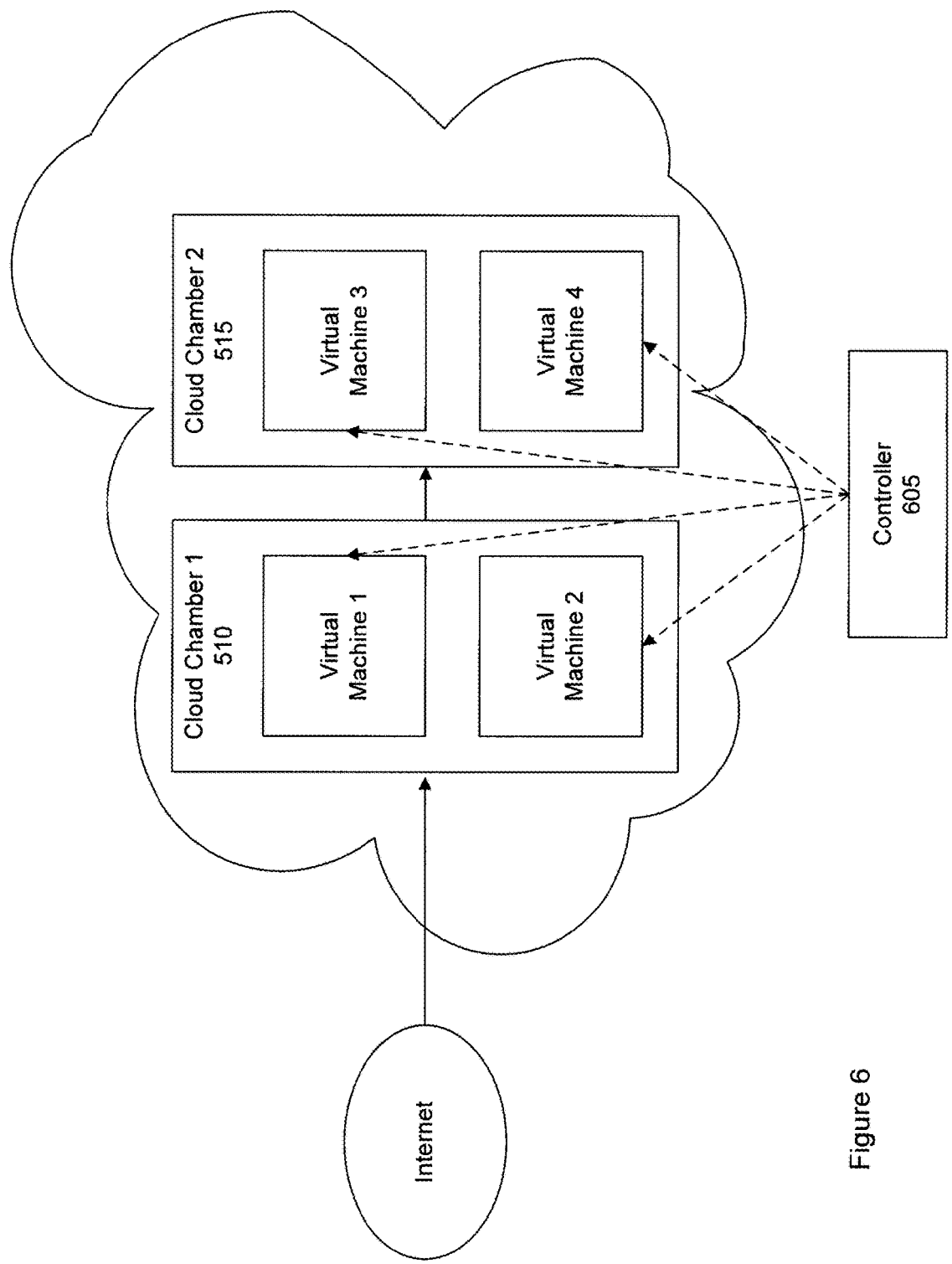

DISTRIBUTED FIREWALL SECURITY SYSTEM THAT EXTENDS ACROSS DIFFERENT CLOUD COMPUTING NETWORKS

CROSS-REFERENCE TO RELATED APPLICATIONS

This patent application is a continuation-in-part of U.S. patent application Ser. No. 14/817,874, filed Aug. 4, 2015, which is a continuation of U.S. patent application Ser. No. 14/190,019, filed Feb. 25, 2014, now U.S. Pat. No. 9,130,901, issued Sep. 8, 2015, which claims priority to U.S. provisional patent application 61/769,713, filed Feb. 26, 2013, which are incorporated by reference along with all other references cited in this application.

BACKGROUND

The present invention relates to the field of information technology, including, more particularly, to systems and techniques for distributed firewalls in cloud computing environments.

Generally, a firewall system, such as for a public cloud computing network, is deployed at the periphery of a TCP/IP (Transmission Control Protocol/Internet Protocol) network domain to protect applications and computers behind the network. When any software application or computer that is outside of the network domain attempts to communicate with another application or computer that is inside the network domain, the traffic has to pass the firewall. Depending on the security policy programmed on this firewall, the communication traffic may or may not be approved to traverse through.

In some cases, an enterprise may wish to deploy an application across multiple different cloud computing networks owned by multiple different cloud computing providers. The reasons for doing so vary. For example, one cloud provider may offer a particular service that another cloud provider does not and vice-versa. As another example, deploying across multiple cloud networks can reduce the risk of the application becoming unavailable. Specifically, if one cloud network suffers a failure, the application may continue to run uninterrupted on the other cloud network.

It is very laborious and time-consuming, however, to manage the different peripheral firewall systems that may be provided by the different cloud providers. For example, if the application is to be deployed across two different cloud networks, the enterprise administrator may have to program two different firewall systems to ensure consistency between the different firewall systems. Further, each firewall system may have different designs, interfaces, and programming procedures which can further complicate deployment and management.

Therefore, there is a need for new and improved systems and techniques for providing firewalls in a multi-cloud network environment.

BRIEF SUMMARY OF THE INVENTION

An application profile is provided to manage security of an application deployed across two or more cloud computing networks. A user can define in the application profile first and second server groups, a cloud chamber as including the first and second server groups, and a computing flow to the cloud chamber. A firewall rule is generated based on the computing flow. The firewall rule is distributed to the first server group of the cloud chamber. A copy of the firewall rule is distributed to the second server group of the cloud chamber. The first server group is in a first cloud computing network that is provided by a first cloud provider. The second server group is in a second cloud computing network that is provided by a second cloud provider, different from the first cloud provider.

In a specific embodiment, there is a cloud chamber firewall that is multi-cloud or extends across multiple cloud networks. A complete rules set is no longer fragmented with respect to chains of regional firewalls of different vendors. The cloud chamber can extend to cloud over IP (CoIP) WAN (wide area network) for hybrid cloud and multi-cloud cases. In an embodiment, the cloud chamber firewall is interlocked with network and computing (e.g., security monitoring on endpoint).

In a specific embodiment, the cloud chamber firewall provides for east-west micro segmentation, deep security, and covers VM-to-VM (virtual machine to virtual machine) filtering. The edge firewall does not provide for such features. The traditional WAN firewall is an edge firewall and it works with VPN together and filters pipe traffic on the network edge. In an embodiment, the cloud chamber provides "east-west micro segmentation" to WAN connections and avoids touching the corporate edge firewall (and does not rely on VPN). The cloud chamber firewall can be a VM-to-VM deep security/firewall system that covers hybrid cloud and multi-cloud computing environments.

Other objects, features, and advantages of the present invention will become apparent upon consideration of the following detailed description and the accompanying drawings, in which like reference designations represent like features throughout the figures.

BRIEF DESCRIPTION OF THE FIGURES

FIG. 5 shows an example of computing environment having a cloud chamber system.

FIG. 6 shows another example of a computing environment having a cloud chamber system.

DETAILED DESCRIPTION

Figure 1:
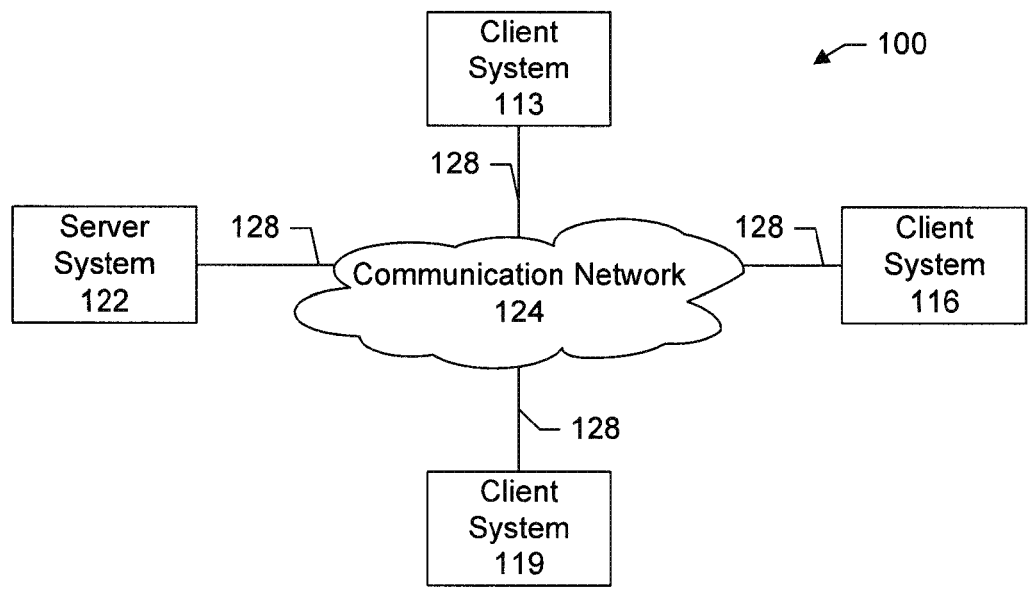
FIG. 1 shows a computer network system within which the present system may be embodied.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
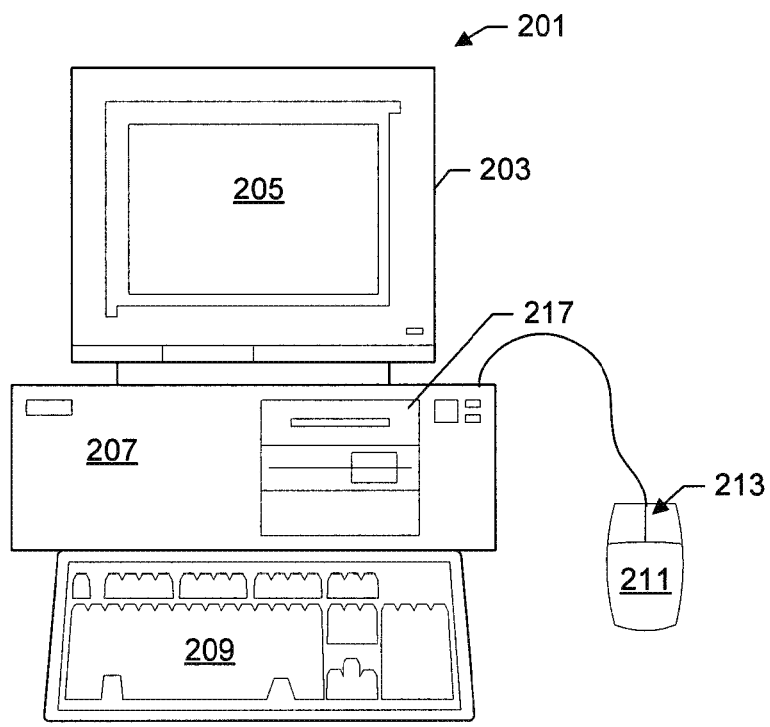
FIG. 2 shows a more detailed diagram of an example of a client or computer which may be used in an implementation of the system.

FIG. 2 shows an example of a client or server system that may be used to execute software of the present system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

A "non-transitory storage medium" or "non-transitory computer-readable storage medium" may include any media that can contain, store, or maintain programs, information, and data. Examples include physical media such as, for example, electronic, magnetic, optical, electromagnetic, or semiconductor media. More specific examples of non-transitory storage medium or non-transitory computer-readable storage medium include a magnetic computer diskette such as floppy diskettes or hard drives, magnetic tape, a random access memory (RAM), a read-only memory (ROM), an erasable programmable read-only memory (EPROM), a flash drive, a compact disc (CD), or a digital video disk (DVD).

A "processor" may include an instruction execution system such as a computer/processor based system, an Application Specific Integrated Circuit (ASIC), a computing device, a hardware system, a software system, or combinations of these that can fetch or obtain the logic from a non-transitory storage medium or a non-transitory computer-readable storage medium and execute the instructions contained therein. A "processor" can also include any controller, state-machine, microprocessor, cloud-based utility, service or feature, or any other analogue, digital and/or mechanical implementation thereof.

Figure 3:
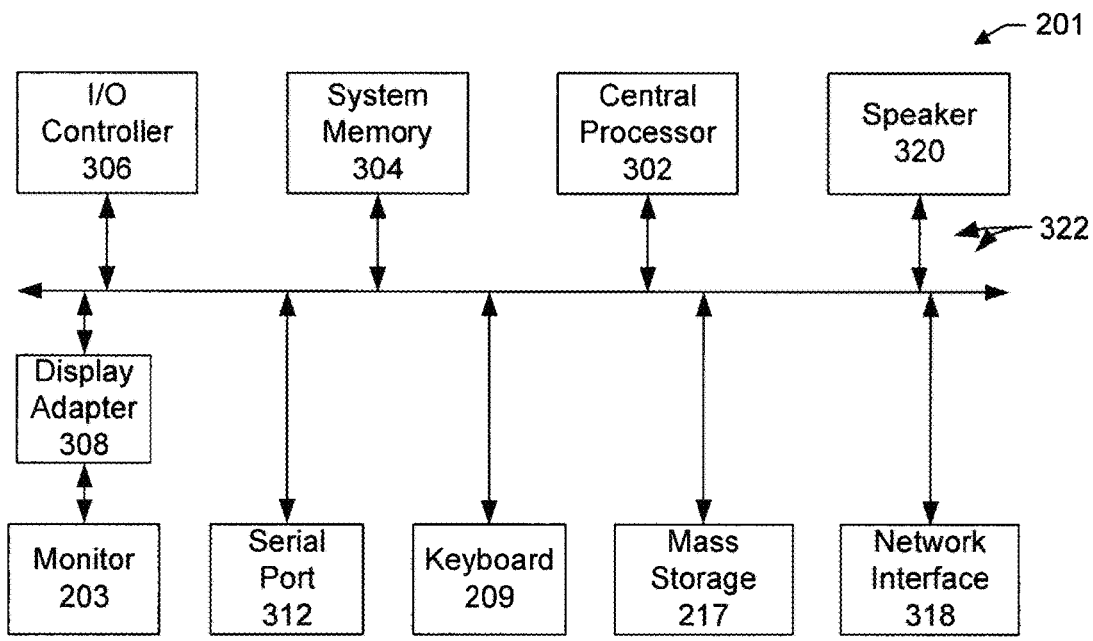
FIG. 3 shows a system block diagram of computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows Server 2008, 2012, Windows NT®, Windows 2000®, Windows XP®, Windows XP® x64 Edition, Windows Vista®, Windows 7®, Windows CE®, Windows Mobile®, Windows 8.1, Windows 10), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4A:
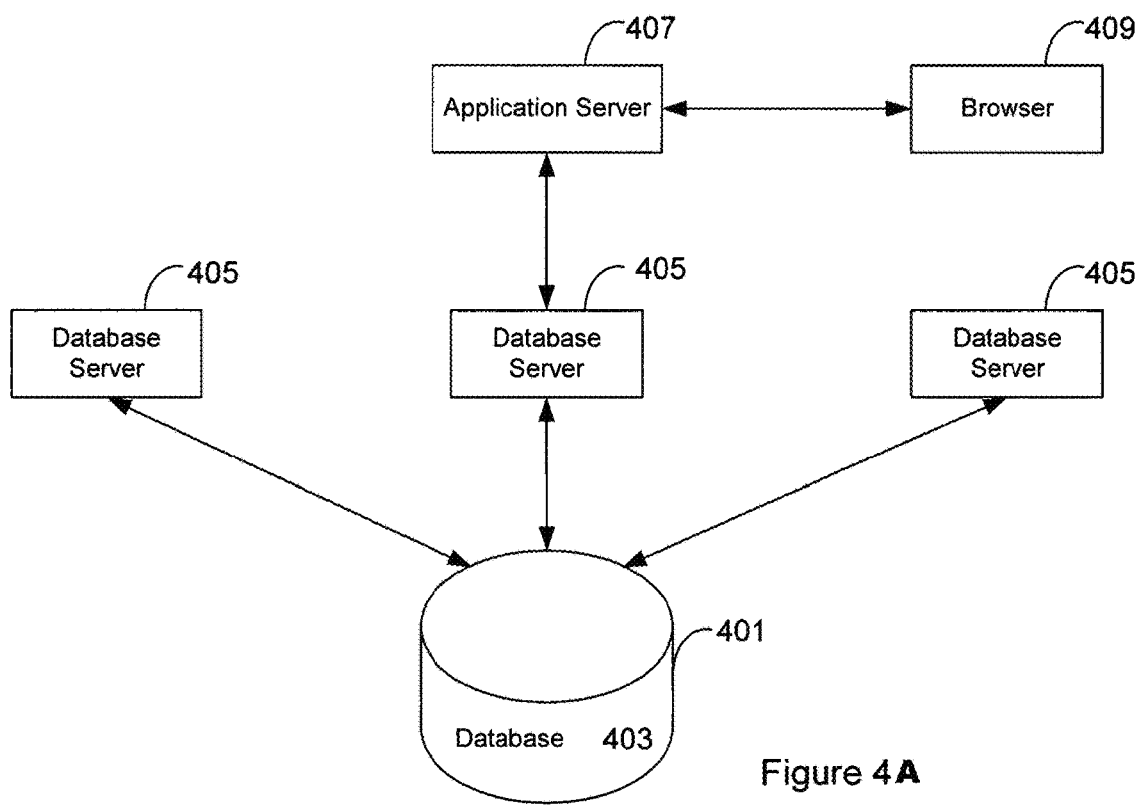
FIG. 4A shows a data source or data service in the form of a database system.

FIG. 4A shows a data source or data service in the form of a database system within which the present system may be embodied. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 4B:
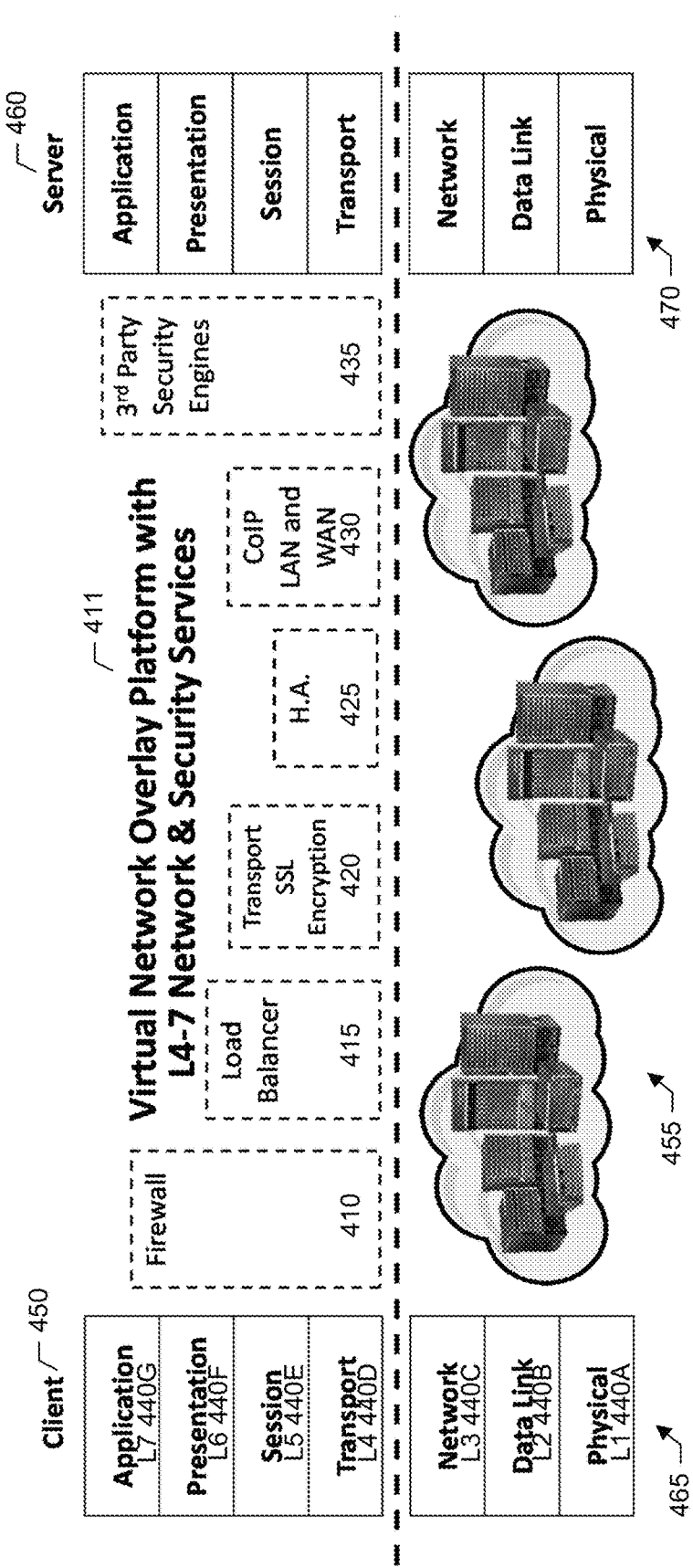
FIG. 4B shows a block diagram of a virtual overlay network system that is positioned as an L4-L7 network service, under some embodiments.

FIG. 4B shows a block diagram of a Cloud over IP (CoIP) system 411. The CoIP system may be referred to as a virtual overlay network platform. This virtual network platform can be used to connect different computing networks including different cloud computing networks that may be provided, owned, operated, or hosted by different cloud providers. Examples of cloud computing networks include Google Cloud Platform as provided by Google, Inc.; Amazon Web Services (AWS), as provided by Amazon; Microsoft Azure, as provided by Microsoft Corporation, and others. The virtual network platform can be used to connect, for example, AWS and Google Cloud; or AWS and an enterprise's own private datacenter.

In a specific embodiment, the system provides layer 4 (L4) to layer 7 (L7) network services that can be fully controlled by enterprises and deployed remotely over a hybrid environment, using the under layers but not integrated or coupled with the under layers. Today, enterprises are facing many challenges when connecting to the cloud. The IP network (L3) is fragmented in the cloud outsourcing environment and controlled by various vendors. The security controls are also not unified. It is challenging and not productive for enterprises to implement a unified IP network to support end-to-end connections across the cloud. The CoIP systems and techniques as described herein provide enterprises with a unified networking method to instantly connect all endpoint resources (including virtual machines (VMs), containers, servers, and legacy Internet Protocol (IP) addresses) across cloud datacenters, decoupled from the underlying IP and security infrastructures.

In this specific embodiment, the CoIP system is an L4 to L7 network service where session layer and transport layer protocols are utilized to establish L3 IP network connections across multiple cloud datacenters. The lower layer IP networks are used as the IP forwarding fabric, but do not need to be directly controlled or reconfigured by the enterprise customers for multi-tenancy security reasons. The CoIP connections, triggered as a virtual L3 network by the upper layer applications running on the top of the stack, can therefore be established very rapidly across the cloud ecosystems. The CoIP system may be referred to as an overlay network, virtual overlay network, or virtual networking platform. It should be appreciated that the system may be known by any name or identifier.

FIG. 4B shows the seven-layer network stack according to the Open Systems Interconnection model (OSI model). CoIP networking platform and system 411 is positioned as an L4 to L7 network service, decoupled from the lower L2 and L3 IP network fabric that is fragmented in the cloud.

The decoupled CoIP network (L4 to L7) from the underlying IP network (L2 and L3) is a desirable technology feature in the new cloud outsourcing environment. Specifically, when an end-to-end CoIP connection is established across a hybrid cloud, it does not require building an end-to-end L2/L3 transport to support the CoIP connection. In a multi-tenancy cloud datacenter controlled by a cloud vendor, the direct access to the L2 and L3 IP network is limited to the datacenter administrator only. Some software defined network (e.g., SDN) may be deployed on top of the L2 and L3 network inside a datacenter or a specific network domain to offer some limited programmability to customers via an application programming interface (API). Building the end-to-end L2/L3 IP transport across a hybrid cloud outsourcing environment is the bottleneck in today's market, and the CoIP systems and techniques as described herein addresses this bottleneck.

The security control in such an environment may be referred to as "shared responsibility" by the Infrastructure as a Service (IaaS) cloud service providers. Enterprise customers typically have full control inside the cloud instance (e.g., VM, container, or bare metal server) plus a set of APIs to program a virtual network environment in the specific cloud datacenter where the provisioned cloud instances are allocated within. Advanced network controls such as programming specific routing rules, access control list (ACL) rules, firewall insertions, source/destination network address translation (NAT), network flow mirror, and so forth, however, are not provided. This "shared responsibility" practice changes the way how the enterprise IT works in the cloud compared to the on-premise enterprise environment, which has created significant adoption barriers.

The IP networks inside the enterprise are not easy to change either. Typically the network will have been designed statically and it is under production with corporate compliance auditing conducted constantly on a quarterly or monthly basis. In such an enterprise production environment, it is difficult to "rip and replace" and to implement a new and transparent cloud network for a specific application, owned by a specific business unit, without impacting the production environment. As a result, the productivity of connecting to the cloud has been low due to the interoperation with the legacy infrastructure.

The CoIP network technology, connected in L4 to L7 and decoupled from the underlying IP network fabric, in both the cloud and enterprise environments, addresses this bottleneck and thus can significantly boost productivity.

As shown in FIG. 4B, in a specific embodiment, the CoIP system operates in a packet switched network according to a set of protocols implemented in a seven-layer protocol stack. The CoIP system includes various networking and security services, components, modules, or code components including but not limited to firewall 410, load balancer 415, transport Secure Socket Layer (SSL) encryption 420, high-availability (HA) 425, cloud over IP local area network (LAN) connections and wide area network (WAN) connections 430, and security engines 435. The functions are provided as layer 4 to layer 7 network services over the lower level (layer 1 to layer 3) network components.

As will be appreciated by those skilled in the art, the process of sending a message involves dividing the message into a set of packets of fixed or variable length, transmitting each packet individually over the network, and then reassembling the message at the destination. The process can be divided into the seven-layer OSI structure shown in FIG. 4B. There is a physical layer 440A (L1), data link layer 440B (L2), network layer 440C (L3), transport layer 440D (L4), session layer 440E (L5), presentation layer 440F (L6), and application layer 440G (L7).

Each layer of the protocol stack performs a specific function, such as addressing, routing, framing and physical transmission of packets. The lower layers (i.e., network, data link and physical layers) function to provide a physical connection between users or processes, and the upper layers (i.e., application, presentation, session and transport layers) provide actual data exchange between processes, users, or both. Specifically, the physical layer may include low-level networking equipment such as hubs, repeaters, modems, cabling, and so forth. The data link layer checks for physical transmission errors and packages bits into data "frames." The network layer provides routing above the data link layer. When data arrives at the network layer, the source and destination addresses contained inside each frame are examined to determine if the data has reached its final destination. If the data has reached the final destination, the network layer formats the data into packets delivered up to the transport layer. Otherwise, the network layer updates the destination address and pushes the frame back down to the lower layers.

The transport layer delivers data across network connections using a protocol such as Transmission Control Protocol (TCP). The session layer manages the sequence and flow of events that initiate and terminate network connections. The presentation layer handles syntax processing of message data such as format conversions and encryption and decryption needed to support the application layer above it. The application layer supplies network services to end-user applications or application programs. Network services are typically protocols that work with the user's data. For example, in a Web browser application, the application layer protocol Hypertext Transfer Protocol (HTTP) packages the data needed to send and receive Web page content. Other examples of application layer protocols include File Transfer Protocol (FTP) and Simple Mail Transfer Protocol (SMTP). The application layer provides data to (and obtains data from) the presentation layer.

To transmit the packet from a source system (e.g., client 450) at one end of a network 455 to a destination system (e.g., server 460) at another end of the network, the packet is passed logically downward through the layers of a protocol stack 465 at the source and then logically upward through the layers of a protocol stack 470 at the destination. Each layer passes the packet to an adjacent upper or lower level layer depending on whether the packet is being sent or received.

The sending of data over the network includes a data encapsulation process at the source and a data decapsulation process at the destination. For the data to traverse the WAN, the system may involve multiple encapsulation/decapsulation processes. Specifically, during encapsulation, a layer of the protocol stack in the transmitting process may add a respective header to the packet. The header provides information to the corresponding layer in a receiving process at the destination system. Thus, as a packet passes down through the protocol stack on a transmitting system (e.g., source system), the packet may gain additional headers. At the bottom of the stack, the transmitting process may then frame the packet and physically transmit it over the network toward its destination. For example, the transport layer may add a TCP header to the data. The network layer may add an IP header. The data link layer receives a packet from the network layer and is responsible for placing the packet onto the network medium (e.g., cable). The data link layer encapsulates the packet in a frame which may include the hardware address (MAC) of the source and destination, and so forth.

When the packet reaches its destination, a decapsulation process is performed. The packet passes up through the protocol stack of the destination system. Each layer of the protocol stack in the destination system receives information from its associated header and will strip its header from the packet before passing the packet up to the next layer for processing.

Figure 4C:
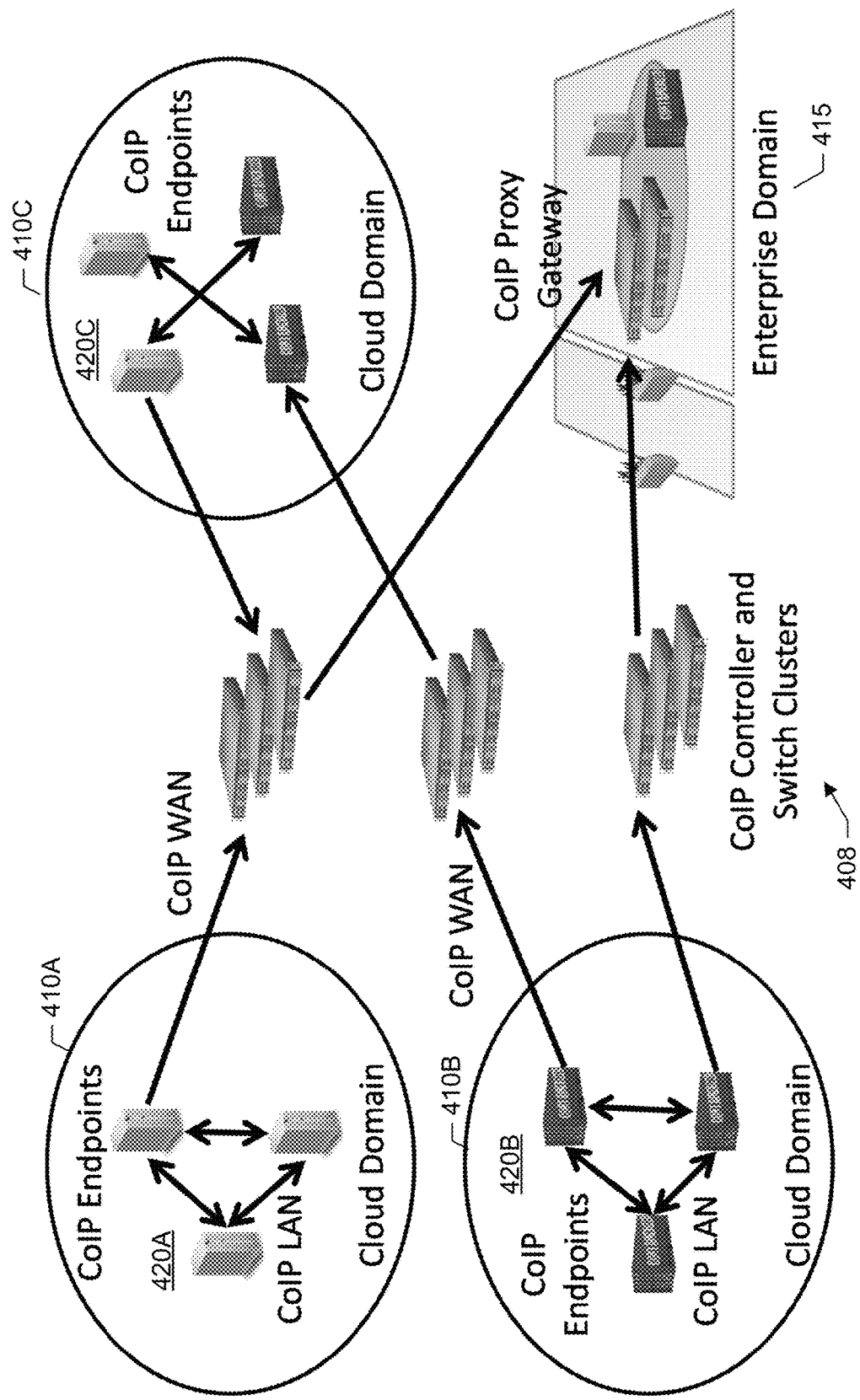
FIG. 4C shows an architecture of the virtual overlay network.

FIG. 4C shows the CoIP architecture according to a specific embodiment. The architecture includes a central array of session layer switches 408 connecting cloud domains 410A-C (including enterprise domains 415) with CoIP endpoints 420A-C provisioned within. The central array of session layer switches is presented in a logical and central architecture in FIG. 4C. In actual deployment, it can include any number of clusters that are deployed in a distributed fashion worldwide along with cloud datacenters, enterprise network domains, or both. The distributed deployment allows enterprises and cloud providers to optimize routing for global WAN connections.

The CoIP endpoint can be a VM, container, server, laptop or desktop, or CoIP Proxy Gateway. In an embodiment, the CoIP Proxy Gateway is a gateway device that bridges the CoIP network plane with the underlying physical IP network plane. The CoIP endpoints can connect via CoIP WAN or CoIP LAN connections. Both CoIP WAN and LAN support IP routing with CoIP addresses or physical IP addresses, and in addition with SSL encryptions. A CoIP address may be referred to as a virtual IP address, layer 5 IP address, or overlay IP address. The CoIP address is presented to the upper layer applications as a virtual L3 IP address.

In an embodiment, the CoIP endpoints connect via CoIP WAN or CoIP LAN using CoIP addresses. The applications running on the CoIP endpoints use CoIP addresses and generate application traffic. Such traffic triggers the CoIP system to create SSL encryption tunnel(s) with the application traffic (using CoIP addresses) encapsulated inside the SSL tunnel. The SSL tunnel(s) is structured using the underlay physical IP addresses and specific port (e.g., 9797) between the source and destination endpoints.

In another embodiment, CoIP endpoints connect via CoIP WAN or CoIP LAN using physical IP addresses. The applications running on the CoIP endpoints use physical IP addresses and generate application traffic. Such traffic triggers the CoIP system to create SSL encryption tunnel(s) with the application traffic (using physical IP addresses) encapsulated inside the SSL tunnel. The SSL tunnel(s) is structured using the underlay physical IP addresses and specific port (e.g., 9797 which is different from the application ports used in the application traffic) between the source and destination endpoints. The SSL encryption tunnel(s) can use both CoIP addresses and the under layer physical IP addresses to build.

On the CoIP architecture, an endpoint can be assigned with a CoIP address, which is an IP address that is specifically routed on the CoIP network plane. The CoIP address may be referred to as a virtual IP address. A CoIP endpoint can connect to a CoIP network plane as well as a physical network plane. In a specific embodiment, when there is an IP address conflict, the CoIP network plane takes precedence for routing. This means when the system runs into a situation where both L5 and L3 routing paths are available, the L5 CoIP routing takes priority. In the network stack, the CoIP system may encounter a situation where a L5 CoIP address is the same as another L3 physical IP address. In such a situation, when a routing decision has to be made, the CoIP address or routing takes precedence. It is recommended, however, that the user who designs the network using CoIP as the L5 overlay, should design the subnets such that L5 and L3 IP address conflicts are avoided. Nonetheless, there may be cases where conflicts may arise. In a specific embodiment, the system defaults to the CoIP routing. In another specific embodiment, the L3 physical IP address routing may take precedence in cases of conflict between a L5 CoIP address and a L3 physical IP address.

The baseline architecture supports a "one-hub" routing and further discussion is provided in U.S. patent application Ser. No. 14/187,091, filed Feb. 21, 2014, now U.S. Pat. No. 9,525,564, issued Dec. 20, 2016, ('564 patent), which is incorporated by reference along with all other references cited.

In a specific embodiment, connections across cloud domains (WAN) route through the central switch clusters. CoIP LAN supports local network connections inside a cloud domain that are routed via the low level L2 and L3 network inside the datacenter. In a specific embodiment, the CoIP LAN does not route through the central switch clusters or any other central gateway for optimized local routing performance. The lack of routing through a central switch or other central router facilitates support for a high-performance datacenter network (LAN) implementation in the under layer. Without routing through a central gateway for optimized performance, the tradeoff is more sensitive security control to prevent the man-in-the-middle attack as well as for service isolation. The endpoint authentication and session control are extremely important for the LAN connections from the security perspective. For the local connections inside the cloud domain (i.e., LAN), the user can define the routing method using either the low-level physical IP address or the high-level virtual IP address (i.e., CoIP address). The high-level virtual IP address can be any IP address, static or dynamic, as long as it does not conflict with the local physical IP address inside the local datacenter within the same routing plane for the same application. In a specific embodiment, if there is a conflict for local routing, the virtual IP address takes precedence.

The capability of the CoIP LAN system to support local routing using the virtual network IP (rather than the local datacenter IP) is desirable to assure the application layer transparency. For example, many of the enterprise applications may have hard-coded the low-level physical IP as part of the legacy computing infrastructure. As a result, it can be extremely challenging for an IT department to migrate the applications (including the execution environments, scripts, and so forth) to any other outsourcing cloud environment as the IP address may be an Internet static IP which is constrained by geographic locations. The capability in supporting a virtual routing layer that allows any static or private IP addresses in the cloud overlay network above the physical network removes the geographic location dependency. This capability may be referred to as "network in motion." The hard-coding of the low-level physical IP network within the legacy enterprise applications is a major bottleneck for "virtualization in motion" across hybrid clouds and multi-clouds.

In a specific embodiment, the CoIP plane (LAN and WAN) is designed as an application network which is a closed network and can be provisioned with limited instances that are authenticated to participate. In other words, rather than being an open network with "unlimited endpoints," in this specific embodiment, only authenticated endpoints can participate and use the CoIP plane. This helps to facilitate a very secure system. One CoIP plane is assigned to one application for service isolation, and it is by definition decoupled from other CoIP planes for other applications for network routing. Therefore it is extremely easy to deploy many applications to hybrid cloud environments over CoIP without worrying about IP address conflicts. This is a very desirable feature because it enables a corporate IT department to setup one cloud environment (e.g., AWS, Microsoft Azure, Google Cloud) and then leave it to the Line of Businesses (LOB) to instantiate their cloud endpoints and assign their CoIP addresses without worrying about cross-LOB conflicts. All applications provisioned in this method automatically achieve cloud service isolation for optimized or improved security.

In a specific embodiment, the CoIP system is a closed network. In this specific embodiment, when two CoIP endpoints are communicating with each other, the control plane will go through a security policy checking and authentication before establishing the connection using either CoIP WAN or CoIP LAN. Further discussion of CoIP wide area network (WAN) and local area network (LAN) routing is provided in U.S. patent application Ser. No. 15/442,469, filed Feb. 24, 2017, which is incorporated by reference.

In a specific embodiment, the virtual network platform includes a cloud chamber managing firewall rules pushed to endpoints (e.g., virtual machines or other firewall enforcement points) in the cloud chamber.

More particularly, FIG. 5 shows an example of a cloud-computing environment having a cloud chamber. In the example shown in FIG. 5, there is a first cloud chamber 510, and a second cloud chamber 515 implemented in the cloud-computing environment. The first cloud chamber includes computing resources such as first and second virtual machines. The second cloud chamber includes another set of computing resources such as third and fourth virtual machines. It should be appreciated that a cloud chamber can include any number of virtual machines and there can be any number of cloud chambers.

In a virtual machine environment, the hardware platform may be referred to as a host, host machine, or host computer. The host uses the virtualization software to run the virtual machines or virtual devices. Generally, virtualization is an abstraction layer that allows multiple virtual environments to run in isolation, side-by-side on the same physical machine. A virtual machine (VM) is a software implementation of a machine (e.g., a computer) that executes programs like a physical machine. In other words, the virtual machine is a software abstraction of a physical computer system that is installed as a "guest" on the "host" hardware platform.

A virtual machine can include a guest operating system, guest applications running on the guest operating system, and virtual hardware which represents a hardware state of the virtual machine. The virtualization software may include a hypervisor or virtual machine monitor (VMM) that presents the guest operating system with a virtual operating platform. Virtual hardware refers to the hardware resources allocated to the virtual machine and is mapped to the hardware platform. The virtual hardware may include virtual disks, virtual processors, virtual system memory, and various virtual devices for which the guest operating system includes corresponding drivers. A host hardware platform may host multiple virtual machines. Each virtual machine may be assigned an identifier such as an internet protocol (IP) address.

In a specific implementation, the cloud-computing environment is provided by a cloud services provider. The type of cloud provided by a cloud services provider may be referred to as a public cloud. A public cloud refers to a computing infrastructure in which services are rendered over a network that is open for public use (e.g., Internet). The public cloud can offer on-demand network access to a shared pool of configurable computing resources (e.g., networks, servers, storage, applications, and services).

Some characteristics of a public cloud include on-demand self-service (e.g., consumer can unilaterally provision computing capabilities such as server time and network storage), resource pooling (e.g., the provider's computing resources are pooled to server multiple consumers using a multi-tenant model, with different physical and virtual resources such as storage, processing, memory, and network bandwidth dynamically assigned and reassigned according to consumer demand), elasticity (e.g., capabilities can be elastically provisioned and released to scale outward and inward based on demand), and metering (e.g., resource usage can be monitored and reported for billing). Some examples of cloud computing service providers include Amazon Web Services (AWS), Microsoft Azure, HP Public Cloud, IBM Smart-Cloud, and many others. It should be appreciated, however, that the cloud chamber system may be implemented in any type of cloud such as a private cloud, community cloud, hybrid cloud, or distributed cloud.

In a specific embodiment, a cloud firewall is implemented in a cloud computing environment. In this specific embodiment, the cloud firewall helps to protect enterprise applications, virtual machines, data, or combinations of these running in the cloud. In this specific embodiment, without using any TCP/IP network topology information, a "cloud chamber" is defined as a virtual peripheral firewall structure to protect those enterprise resources inside a protected zone which is isolated away from the outside world.

The traditional network topology based firewall protects resources and data sitting on the sub-tree "behind" the firewall. A "cloud chamber" (i.e., cloud firewall) as described in this patent application instead implements a logical structure where resources are protected if placed "inside" the chamber. To protect the resources and data inside the chamber, a set of firewall rules can be generated for all virtual machines, physical servers, other components, or combinations of these inside the chamber to explicitly check and filter all communication traffics among them inside the chamber and the communication traffics with components outside of the chamber that cross the boundary of the chamber.

Some benefits of the "cloud chamber" include:

1) All applications and virtual machines placed logically inside this structure are protected against traffic coming from outside of this structure. The cloud firewall is a peripheral firewall that protects the logical boundary, not physical network boundary.

2) All applications and virtual machines behind this cloud firewall may freely communicate with each other (based on security policy) regardless of the underlying network structure for the "cloud chamber." The private communications inside the "cloud chamber" can be such that they do not impact the network performance for the applications and virtual machines.

3) The communication from the applications or virtual machines going outside of the "cloud chamber" may also be protected/prevented based on the security policy.

The cloud chamber is a virtual and logical structure. It can be implemented anywhere in a cloud regardless of the underlying network topology. All resources provisioned inside this logical structure can be protected by the security policy and firewall rules. All other resources can be considered "outside" of this protection zone.

Multiple cloud chambers can be implemented jointly to satisfy the security policies that protect all applications running in a cloud. These policies can define ingress traffics, egress traffics, as well as inter chamber traffics. These policies can be stateful and sophisticated. In a specific embodiment, security policy at the chamber level is "statically" defined by users via the definition of the application profile, once. The firewall rules for all items in a chamber (e.g., virtual machines (VMs)) will be automatically generated from the application profile, along with the chamber definition as well as the provisioning information for the computing resources (e.g., VMs, components, and their IP addresses), and applied to each VM and other components. When a cloud orchestration manager provisions a VM (add or delete), the firewall rules will be updated in all involved VMs (i.e., the neighbors). Meanwhile, the application profile along with the security policy may be never or rarely changed.

In the example shown in FIG. 5, the two cloud chambers together implement a two tier computing structure in a cloud. Tier-1 can include any number of servers and is implemented in cloud chamber 1 and is connected to the Internet. Tier-1 connects to Tier-2. The first virtual machine (VM1) and second virtual machine (VM2) run tier-1 applications. For example, tier-1 may host application presentation components or services.

Likewise, Tier-2 can include any number of servers and is implemented in cloud chamber 2. In the example shown in FIG. 5, the third virtual machine (VM3) and fourth virtual machine (VM4) run tier-2 applications. Tier-2 may connect to a database (not shown). For example, the business logic for the application may reside at tier-2. The first cloud chamber 1 implements a firewall policy that protects applications running in the first and second virtual machines. Given the elastic nature of a cloud environment, more servers (e.g., VMs or physical servers) can be added or removed by the cloud orchestration system to or from the Tier-1 group and the Tier-2 group, depending on the computing needs.

In a specific implementation, from the perspective of the first cloud chamber 1, all other resources (e.g., computers on Internet, third virtual machine, or fourth virtual machine) are all outside of its firewall. The first and second virtual machines are behind its firewall. From the perspective of the second cloud chamber 2, only the third and fourth virtual machines are behind its firewall. The firewall rules are correspondingly implemented.

The security policies can be further defined such that the first and second virtual machines are not allowed to communicate with each other. This may be referred to as a "silo tier" in a cloud chamber. The security policies can be defined such that all communications between the third and fourth virtual machines inside Tier-2 are allowed. This may be referred to as a "connected tier."

For example, in some cases it will be desirable for the cloud applications to implement a "silo" property inside a tier. In FIG. 5, VM1 and VM2 are in Tier-1. VM1 and VM2 are serving the same function or role. They typically do not need to communicate with each other. Instead, they communicate with Tier-2 machines, e.g., VM3 and VM4. So when specifying "silo tier," the security policy is requesting to implement a tight security implementation where any communication between VM1 and VM2 are not allowed. If any traffic between VM1 and VM2 is detected by the firewall system, the traffic should be blocked and an alert is generated as a warning. A security policy, "silo" versus "connected," may be associated to the tier or server group, rather than the cloud chamber. A cloud chamber can include a tier that is silo with another tier that is connected.

However, there can be exceptions. Some applications may require VM1 communicating with VM2 occasionally. A user can then specify a "connected tier," which is a security policy that allows mutual communications among servers inside a tier. It should be appreciated that the user may specify more tiers with details to explicitly describe the communications/computing flows among VMs. These descriptions can be the "security policies" where the cloud chamber system will then explicitly protect those by generating detailed firewall rules for each different VMs in different tiers. In a specific embodiment, the security policy is or is based on the computing flows.

In a specific embodiment, the application profile with the computing flows describes how the tiers (and thus the VMs or servers provisioned into those tiers) are allowed to communicate with each other. Based on this information, the firewall rules are then generated for each group of VMs in each tier to implement security. Together, that protects the computing flows, which matches or corresponds with the definition of "cloud chamber."

In another specific embodiment, there can be a separate security policy that can be attached the application profile. The separate security policy can specify additional network security and actions as desired. An example in a specific embodiment there can be a specific security policy that tracks a malicious computing flow or flows. The flows may be defined in the application profile and may route the traffic to a standby security server or system for monitoring and behavior analysis. The traffic following this path can trigger an action, depending on the analysis result, to lock or place the source server into a security quarantine area for further screening. In another specific embodiment there can be a defined malicious computing flow that will be blocked by the firewall and directly trigger the lock of the source server into a quarantine area for further screening without depending on a live security analysis.

The "cloud chamber" structure is virtual, logical, and does not exist physically in a cloud. In a specific embodiment, the chamber firewall system is implemented in a distributed fashion with firewall components in each of the items (e.g., virtual machines or physical servers) involved inside all chambers. These firewall components can filter network traffic at the virtual machine level.

FIG. 6 shows a specific embodiment of a system implementing a cloud chamber. In this specific embodiment, there is a central controller or controller server 605 that records the application profile, the multiple chamber structure (logical) as well as the peripheral security policies. These central security policies are then compiled and converted to detailed firewall rules that are pushed into each of the virtual machines to be protected by the cloud chamber system. The central controller is a policy holder and compiler. The actual network traffic is not routed to or filtered by the controller.

For a "connected tier" in a cloud chamber, the firewall rules for all virtual machines inside the tier can be slightly different due to the definition of the "neighbors" that each virtual machine can or cannot connect with, as well as the firewall rule definition in terms of source and destinations for the allowed traffic. Given a cloud chamber structure, the central peripheral security policy stored in the controller can be static and not changing or reacting to the addition or deletion of VMs from the tier in the chamber. This security policy is defined to protect the applications running in the cloud. However, the compiled firewall rules for each virtual machine can be dynamically changing, depending on the virtual machines (e.g., "neighbors") added or deleted from the chamber structure. In a specific implementation, the enterprise IT staff or administrator programs the central peripheral security policy in the system. The firewall rules are automatically compiled, pushed, and/or updated in each virtual machine.

Consider, as an example, the environment shown in FIG. 5. In this example, there can be two tiers of servers. Tier 1 which includes VM1 and VM2 is connected to the Internet with ingress port 80. Outbound traffic is not allowed. Tier1 then connects to tier2 (which includes VM3 and VM4) with TCP with port 5000. Reverse traffic is not allowed (but return traffic is allowed). Tier1 is "silo." Tier2 is "connected." There is an application profile with computing flows connecting server groups (or other components, such as a load balancer, subnet groups, database, and so forth). A subnet group can define a subnet IP address range that is allowed to connect to a tier. This may be defined to support network administrators accessing servers or to support some system or cloud related application or flows (e.g., a central storage system provided by the cloud service provider as part of the cloud service).

The cloud chamber system brings many applications and business benefits as described below. In a cloud computing environment where the network and infrastructure are virtualized, it is critical for the security implementation to work seamlessly with the virtual infrastructure and be managed and integrated with the cloud management system. This cloud chamber firewall system can implement all firewall rules on virtual machines, not on a network sub-tree. As a result, this system can work seamlessly with the cloud management infrastructure, allowing static security policy programming and dynamic firewall rule updates for elastic cloud computing.

The cloud chamber firewall system is virtual and yet carries the concept of peripheral firewall that is easy to grasp by the enterprise IT when it comes to implementing security and ensuring corporate compliance. The cloud chamber firewall system is a virtual infrastructure where the central security policy can be programmed in the central controller without provisioning any virtual machines. The central policy can be easily maintained, and the security intelligence can be recorded without frequent change. The dynamic changes in the virtual machine firewall rules are driven by on-demand computing and are all automated.

The performance for the cloud chamber firewall system is optimized or improved. This firewall system can be a logical peripheral firewall (e.g., centralized model), and yet the implementation is distributed. That is, there is no central virtual machine that executes the firewall packet filtering or forwarding for all or a majority of cloud servers as the performance bottleneck. Therefore, a hardware accelerator for the server that implements a central firewall may not be needed in the cloud. A high speed or customized network to accommodate the central firewall system for performance reason is not required either.

The cloud chamber firewall system is agnostic to the underlying network topology and the hypervisor system. This solution can be owned and implemented by the enterprises that are leasing resources in a public cloud, without coupling with the administration support from the lower level cloud datacenter operator. Also this solution applies to multiple IaaS (Infrastructure as a Service) cloud datacenters which may be using different hypervisors. This solution supports a unified security management view over multiple and hybrid cloud implementations at a lower layer for ease of use and consistent security policy implementation. It also supports a "cloud broker" business model that is owned by a neutral vendor on the top of all IaaS cloud vendors.

Figure 7:
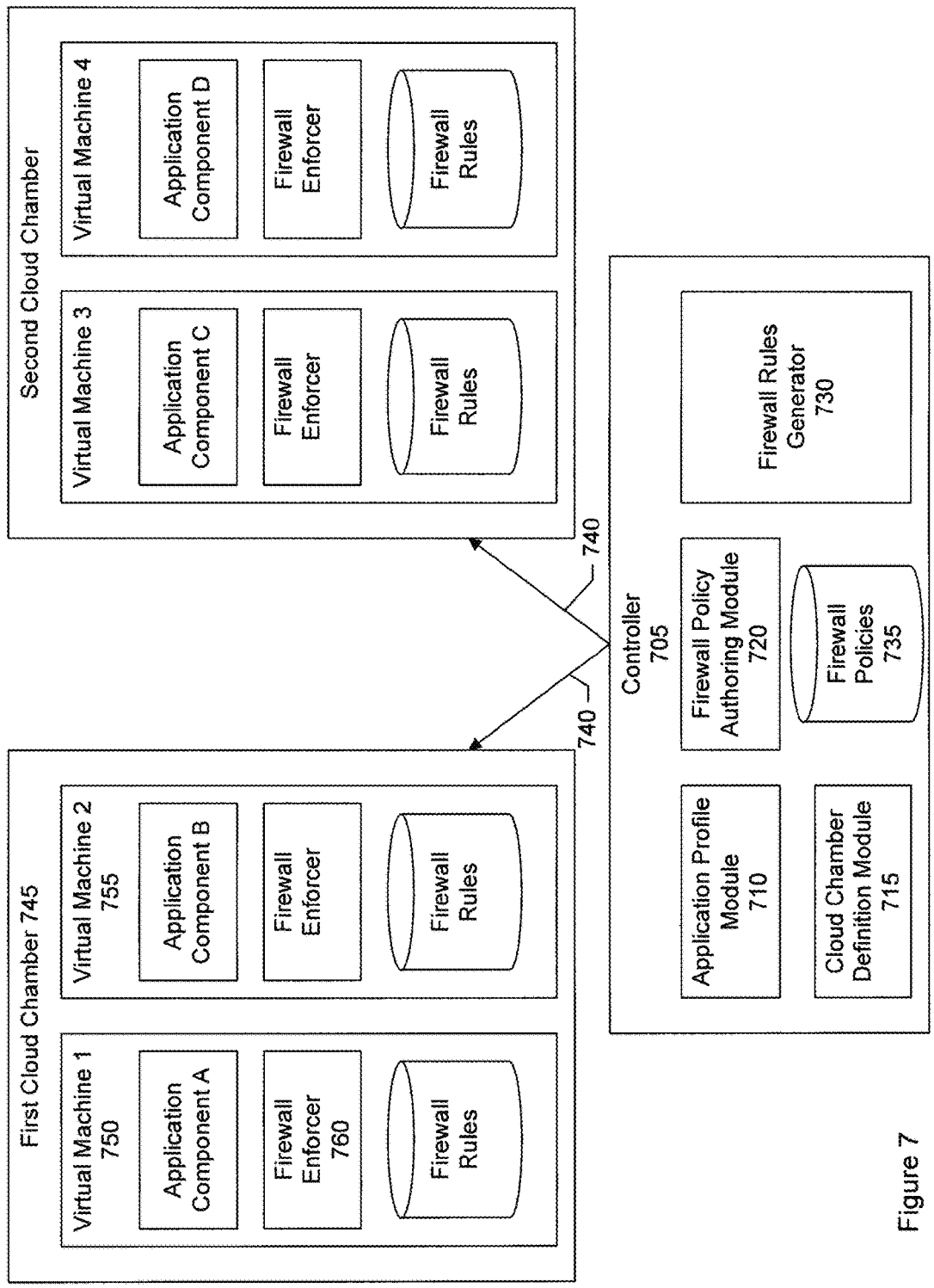
FIG. 7 shows a block diagram of a cloud chamber system.

FIG. 7 shows a more detailed diagram of a specific implementation of a cloud chamber system for cloud-computing environments. This system includes a controller or controller server 705. The controller includes an application profile module 710, a cloud chamber definition module 715, a security policy authoring module 720, a firewalls rules generator 730, and a database 735 for storing security policies.

The application profile module is responsible for receiving, accessing, defining, or obtaining an application profile for an application to be deployed in a cloud-computing environment. The application profile specifies a configuration of cloud resources and application components along with the computing flow information on how the resources are communicating among them.

In a specific implementation, the application profile module provides a user interface (e.g., graphical user interface (GUI)) through which an administrator can specify the configuration and computing flows of the server groups or tiers over which the application will be distributed. The GUI tool may provide user controls for defining, creating, identifying, or specifying server groups, computing tiers, computing components, and computing flows. The GUI tool may include controls for drag-and-drop and drawing the computing flows. In another specific implementation, the application profile module provides an API engine that allows the user (e.g., administrator) to define the application profile with API commands.

The cloud chamber definition module can be used by an administrator to select, specify, or identify the computing resources, such as the computing tiers, server groups, components, or combinations of these to be included in a cloud chamber. The module may present the user or system administrator with a user interface through which the administrator can select which computing component, server group, or tiers to include in the cloud chamber. For example, the administrator may use the GUI tool to click on a particular server group to include in a particular cloud chamber. The module may implement an API engine that allows users to define the chamber with API commands.

The security policy authoring module provides an interface for the user to create, edit, modify, add, delete, and update security policies, beyond the information provided by the application profile. Security policies are stored in the security policy database. A security policy may define at a high-level how an organization's firewalls should handle inbound and outbound network traffic for specific IP addresses and address ranges, protocols, applications, and content types based on the organization's information security policies.

The firewall rules generator is responsible for analyzing, parsing, or examining the application profile (including the security policies) and cloud chamber definition in order to generate firewall rules for all VMs. The generator can deploy, distribute, send, or transmit 740 the firewall rules to each computing resource (e.g., virtual machine) in a cloud chamber.

The firewall rules can then be stored in a firewall rules database at a virtual machine in a cloud chamber. For example, as shown in FIG. 7, there can be a first cloud chamber 745 that includes first and second virtual machines 750 and 755, respectively. The virtual machines provide execution environments for various components, copies, or instances of an application that is deployed in the cloud. In the example shown in FIG. 7, a copy of application component A has been installed at the first virtual machine. A copy of application component B has been installed at the second virtual machine.

Each virtual machine further includes a firewall enforcer 760. The firewall enforcer at a virtual machine is responsible for enforcing the firewall rules that have been distributed to the virtual machine. The enforcer inspects, at a respective virtual machine, network traffic with respect to the virtual machine to determine whether the traffic should be blocked or allowed. The traffic can include inbound traffic (e.g., traffic sent to the virtual machine), outbound traffic (e.g., traffic to be forwarded from the virtual machine), or both. In other words, network traffic is filtered at a particular device (e.g., virtual machine) in the cloud chamber.

Figure 8A:
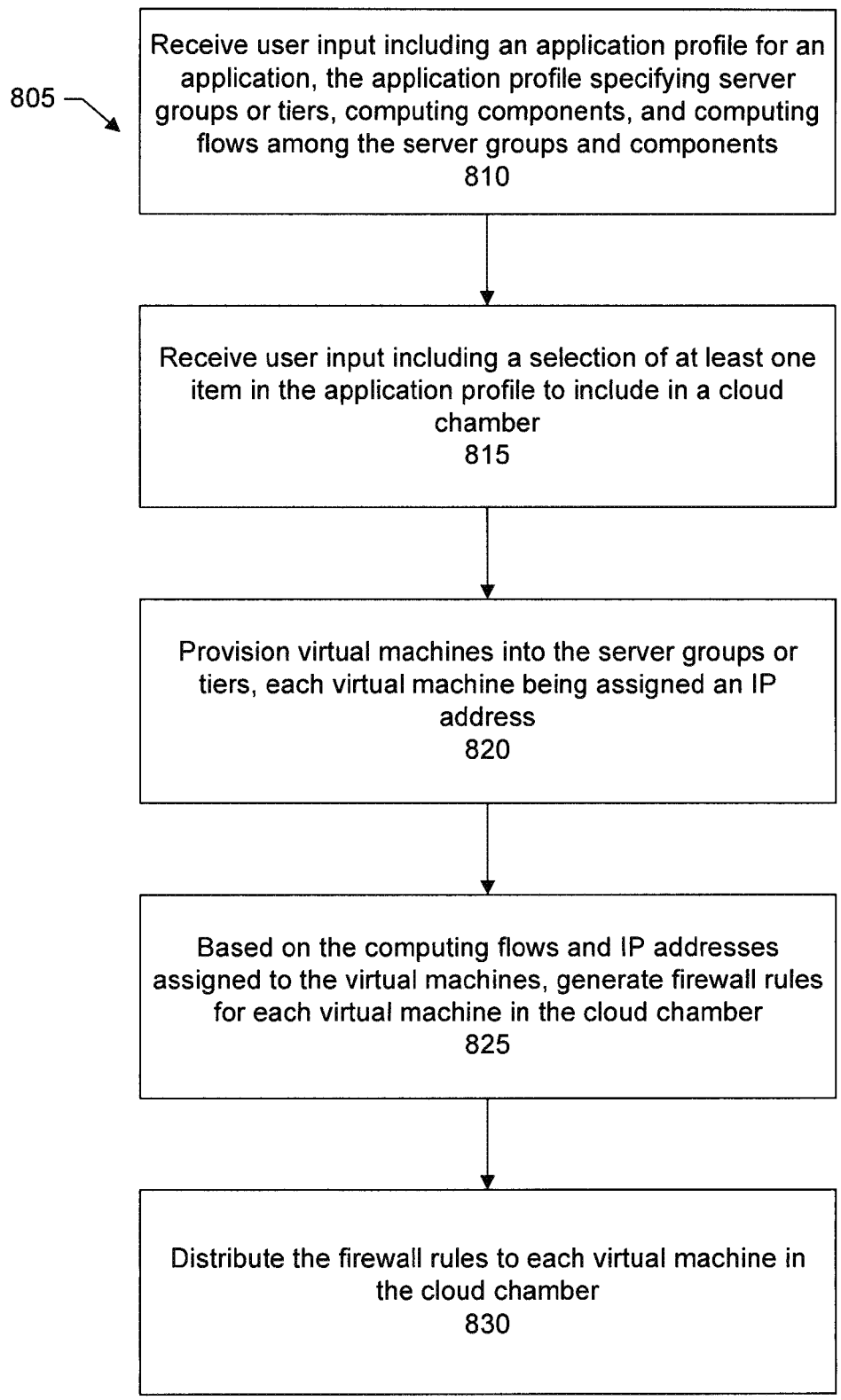
FIG. 8A shows an overall flow diagram of a cloud chamber system.

FIG. 8A shows an overall flow 805 for establishing a cloud chamber system that can protect applications and virtual machines in a cloud-computing environment. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In a step 810, the system receives user input including information about an application to be deployed in a cloud-computing environment. The information may identify computing tiers, groups or server groups, computing components, and computing flows among the tiers, groups, and components. In a specific embodiment, the information is referred to as an application profile. It should be appreciated, however, that the information may be referred to using a different label (e.g., deployment profile, manifest, application framework, deployment schema, or the like).

A tier, server group, or component may be referred to as an item or item collection. A tier or server group can represent a collection of two or more computing nodes or machines that have the same role or function. A tier or server group can include any number of computing nodes. For example, depending upon factors such as the complexity of the application, the expected number of users, desired application response time, service requirements, and so forth, a tier may include 2, 5, 10, 50, 100, 500, or more than 500 computing nodes. A tier may include a single computing node.

In a specific implementation, the application profile is defined by receiving user input through a GUI tool of the application profile module. For example, the user can use the GUI tool to create a first server group, a second server group, and draw a first type of line from the first server group to the second server group to indicate that an allowed or permitted computing flow is from the first server group to the second server group. That is, the first server group is allowed to initiate a connection to the second server group. In this example, the first server group may be referred to as a connection source. The second server group may be referred to as a connection destination. Virtual machines to be provisioned into the first server group may be allowed to initiate connections to virtual machines to be provisioned into the second server group. Virtual machines to be provisioned into the second server group may be allowed to receive incoming connections from virtual machines to be provisioned into the first server group.

Alternatively, the user may draw a second type of line, different from the first type of line, to indicate that the first server group is not allowed to initiate a connection to the second server group. In this example, virtual machines to be provisioned into the first server group may not be allowed to initiate connections to virtual machines provisioned into the second server group.

There can be many different types of computing flows. For example, a first type of computing flow between a first server group and a second server group may allow items (e.g., virtual machines) in the first server group to send data (e.g., data packets, communications, connections, requests, messages, or network traffic) to virtual machines in the second server group. A second type of computing flow between a first server group and a second server group may allow virtual machines in the second server group to receive data from virtual machines in the first server group. The first and second type of computing flows may be referred to as legal, allowed, positive, or permitted computing flows.

A third type of computing flow between a first server group and a second server group may prevent virtual machines in the first server group from sending data to virtual machines in the second server group. A fourth type of computing flow between a first server group and a second server group may prevent virtual machines in the second server group from receiving data sent by virtual machines in the first server group. The third and fourth types of computing flows may be referred to as illegal, blocked, disallowed, negative, black listed, or not permitted computing flows.

It should be appreciated that a GUI is merely an example of a type of interface through which input can be provided to the system. For example, there can be a text-based interface. There can be a programmatic interface. In another specific implementation, the application profile may be created outside of the system. For example, the application profile may be created using a tool external to the system. The application profile may be formatted as an XML, file. In this specific implementation, the system may include a translator to convert the application profile into a structure suitable for use by the system. Any competent technique may be used by the system to obtain or access an application profile.

The application profile describes a configuration of computing components (e.g., services), tiers of virtual machines for the application, and the computing flows among the tiers and components that implement the application. The application profile can also include other components to support network access to the application as well as the administrative access for management purpose. An application profile can describe the computing resources involved in realizing an enterprise application (e.g., web service, enterprise resource planning software (ERP), customer relationship management software (CRM), etc.) running in a cloud or hybrid cloud environment. An application profile can include but is not limited to multiple cloud domains, and in each one there can be multiple server groups, subnet components (e.g., port 80 coming from Internet, a virtual private network (VPN) gateway Internet Protocol (IP) address, or simply an IP address for the administrator's desktop machine for support purpose), and other components such as database, load balancers, and so forth.

There can be components identified in the application profile that are singletons or are not part of a group (e.g., is not a server group). A component may be implemented by a server having a particular function (e.g., load balancer). A component can represent a subnet having an IP address range or a single IP address (e.g., administrator control machine). Another example of component includes a database (e.g., Oracle database). The component (e.g., database) may be offered as a service by the cloud services provider. The IP address associated with the component (e.g., database) can be defined in the application profile so that the virtual machines in the server groups can connect to that database component. Thus, in the application profile, the component will have an IP address associated with it.

Consider, as another example, a requirement for the first tier to connect to the Internet with port 443 (security port). In other words, inbound traffic will be allowed through port 443 TCP to reach a first tier of secure ecommerce web servers. These network properties can be modeled as components defined as subnet components having an IP range that is open to all source IPs having port 443. In other words, a component can be used to model a single instance which can include a network subnet, a single load balancer, or a single database. In contrast, a server group or computing tier is empty (e.g., is without virtual machines) during the application profile definition stage. A particular group or tier can represent a collection of servers that will each implement similar functions for scalability. During production, specific servers may be scheduled into and out of a particular group to accommodate changes in loading, network traffic, and so forth.

Another example of a component includes a load balancer. In some cases, a load balancer will be provided by the cloud services provider. An application profile may define a first computing flow as being from a first load balancer component to a first server group, and a second computing flow as being from a second load balancer component to a second server group.

Cloud service providers continue to provide more and more infrastructure services to support the enterprise building of application. These services can be modeled as components in an application profile. For example, a service can include network storage, an attached virtual disk, or a DNS service, each of which can be modeled as components in the application profile. In turn, the computing flows to and from such components can be protected by the firewall rules generated by the system.

The server groups and the components are interconnected via computing flows (e.g., Transmission Control Protocol (TCP), User Datagram Protocol (UDP), etc.) to realize the enterprise application. A data transfer server (e.g., File Transfer Protocol (FTP) server or a Dropbox server) can be defined or modeled as a component as well. The cloud domains can be connected to each other via virtual networks as described in U.S. provisional patent applications 61/769,691, filed Feb. 26, 2013, and 61/770,320, filed Feb. 28, 2013, and U.S. patent application Ser. No. 14/187,091, filed Feb. 21, 2014, now U.S. Pat. No. 9,525,564, issued Dec. 20, 2016, which are all incorporated by reference. Examples of cloud domains include Amazon Web Services, Microsoft Azure, or an enterprise internal private cloud domain.

A component can include or represent a router, switch, load balancer, generic IP device, server host, disk, interface, database, cluster, web server component, application server, process, DNS (Domain Name System) service, NFS (Network File System) service, LDAP (Lightweight Directory Access Protocol) service, authentication service, monitoring service, searching and indexing service, payment service, messaging service, workflow service, or email service—just to name a few examples.

An application profile can include one or more files that an enterprise administrator or developer provides to interface with the cloud orchestration system provided by the cloud service provider. The cloud orchestration system offered by the cloud servicer provider can use the application profile to deploy the application according to the configuration, specification, or requirements in the application profile. In another specific implementation, another cloud management system that overlays on the top of the cloud orchestration system can compile the information provided by the application profile and interoperate with the cloud orchestration system as the middle layer.

In a specific embodiment, when an enterprise user wishes to implement a cloud chamber system, the application profile will be created first, along with the definition of cloud chamber. At this point, no VM will have been leased yet. In other words, the application profile and cloud chamber are defined before any virtual machines have been provisioned for the application. The application profile is typically a tier-based definition with computing flows and other components (e.g., load balancer, database, subnet group, and so forth) defined without any VM instance in it.

Then the administrator starts to work on the VM configuration with application software provisioned for each tier and saves them in the cloud database. At production, the administrator starts to drive the cloud orchestration system to provision VMs into the application profile (e.g., provision VMs into the computing tiers or server groups specified in the application profile). Once the VMs go into the tier structure, the cloud chamber system will automatically generate all firewall rules and enforce them in all newly added VMs in the different tiers. At production, the administrator typically will not modify the application profile (therefore, the tiers, the computing flows, e.g., the security policies) during the operations. In other words, there is a static setting of the security policies, and dynamic firewall rule generation and enforcement reacting to the elastic cloud computing.

A benefit of the cloud chamber system is that an existing application profile can be reused for generating the firewall rules. This helps to facilitate the implementation of a cloud chamber by reducing the amount of firewall configuration work that is typically required. In a specific implementation, an administrator can use the application profile receiving module to select and upload or import an application profile to the system.

Table A below shows an example of an application profile for an application named PuffyClouds.

TABLE A

```
<?xml version="1.O" encoding="UTF-8"?>
<cloud-application-configuration>
    <application-name>puffyclouds</application-name>
    <tiers>
        <tier-1>
            <name> load-balancer</name>
        </tier-1>
        <tier-2>
            <name>presentation</name>
        </tier-2>
    </tiers>
    <computing-flows>
        <firstflow>
            <from>tier-1</from>
            <to>tier-2</to>
            <protocol>TCP</protocol>
            <port>5000</port>
        </firstflow>
        <second flow>
            <from>tier-2</from>
            <to>database-component</to>
            <IP-address>IP1 <IP-address>
            <protocol> TCP</protocol>
            <port>6000</port>
        </secondflow>
    </computing-flows>
</cloud-application-configuration>
```

The application profile example above is formatted as an Extensible Markup Language (XML) file. XML is a markup language that defines a set of rules for encoding documents in a format or structure that is both human-readable and machine-readable. The profile may be provided as a text file.

The characters making up an XML document include markup and content. Generally, strings that constitute markup either begin with the character "<" and end with a ">," or they begin with the character "&" and end with a ";." A tag is a markup construct that begins with "<" and ends with ">." An element is a logical document component which either begins with a start-tag and ends with a matching end-tag or consists only of an empty-element tag. The characters between the start- and end-tags, if any, are the element's content, and may contain markup, including other elements, which are called child elements. An attribute is a markup construct including a name/value pair that exists within a start-tag or empty-element tag.

Figure 8B:
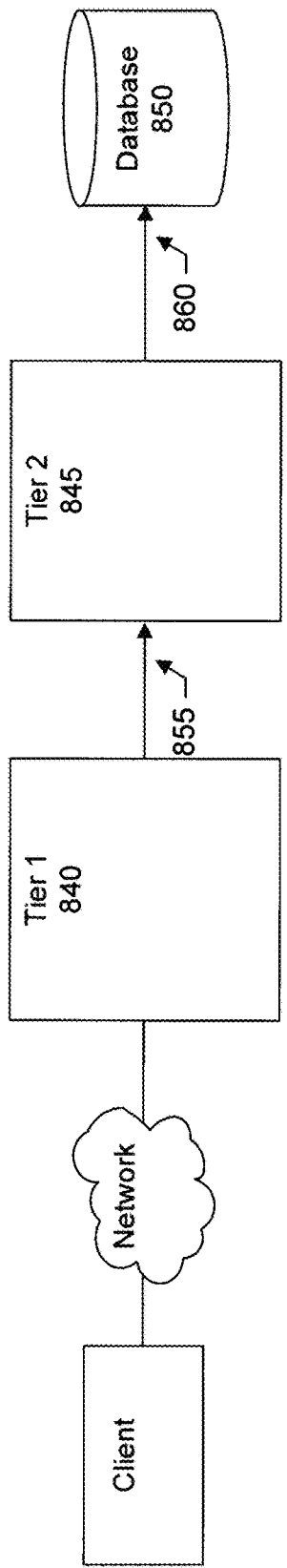
FIG. 8B shows an example of a computing flow that may be included in an application profile.

FIG. 8B shows a graphical example of the application profile specified in table A. As shown in the example of FIG. 8B, there is a first tier 840, a second tier 845, and a component 850. In the figure, the first and second tiers are shown as boxes or containers that are empty, unoccupied, unfilled, vacant, untenanted, or blank to indicate that the tiers have not yet been provisioned with virtual machines. In other words, in a specific embodiment, during the initial application profile definition phase, the tiers (or server groups) specified in the application profile are without virtual machines as the virtual machines have yet to be provisioned in, assigned to, or associated with a particular tier or group. That is, the virtual machines may not yet exist.

In this example, the component is a database. According to the computing flows specified in the application profile, there is a first computing flow 855. A direction of the first computing flow is from the first tier to the second tier. With respect to the first computing flow, the first tier may be considered a source. The second tier may be considered a destination. There is a second computing flow 860. A direction of the second computing flow is from the second tier to the database. With respect to the second computing flow, the second tier may be considered a source. The database may be considered a destination.

In this example, the first tier is to be provisioned with load balancer machines. The second tier is to be provisioned with presentation machines. The first computing flow connects the load-balancer to the presentation machines using, for example, TCP with port 5000. The second computing flow connects the presentation machines to a component representing a database with an IP address (e.g., IP1) using, for example, TCP with port 6000. Attributes of a computing flow can include a source group or component (e.g., tier 1) and a destination group or component (e.g., tier 2).

A direction of the computing flow can be derived by identifying the source and destination. This "direction" can be important security policy information, indicating what TCP traffic is allowed. For example, consider that a particular VM has a virus. One typical action a virus will do is port scan. Assume that one of the presentation machines has a virus. The moment the virus fires an outbound traffic to the load balancer the traffic will get blocked and will trigger an alert. Likewise, when any other machine, other than the load balancer, in the application profile sends traffic to the presentation machine it will get blocked by the firewall and will trigger the alert. The reason is that this traffic is not defined as part of the legal computing flow on the application profile.

The application profile shown in table A and the graphical example of computing flows shown in FIG. 8B are merely examples. It should be appreciated that an application profile for the deployment of a complex enterprise application in a cloud-environment can include any number of cloud domains, computing tiers, server groups, components, computing flows, layers, conditions, requirements, specifications, and so forth. A computing tier may represent a group of servers. A computing tier may include one or more groups of servers.

Referring now to FIG. 8A, in a step 815, the system receives user input including a selection of at least one item, element, or item or element collection from the application profile to include in a cloud chamber. An item can include a server group, a computing tier, or a component. Any number of items can be selected for a cloud chamber. A cloud chamber can include a collection of items having computing flows defined in the application profile.

For example, a cloud chamber can include a single server group, two or more server groups (e.g., three server groups, four server groups, five server groups, or more than five server groups), a single computing tier, two or more computing tiers, a single component, or two or more components (e.g., five components, ten components, 50 components, 100 components, or more than 100 components). A cloud chamber can include a combination of different item types. For example, a cloud chamber may include a server group and components such as a database, load balancer, subnet group, DNS (Domain Name System) service, and so forth.

Figure 8C:
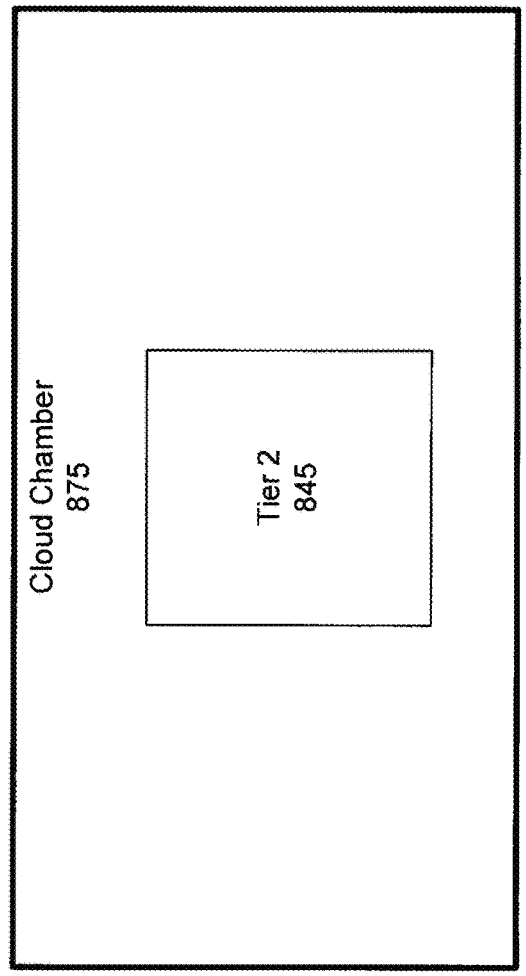
FIG. 8C shows an example of an item selected to be included in a cloud chamber.

FIG. 8C shows a block diagram of the second computing tier or server group having been selected to be included in a cloud chamber 875. The items or elements selected for inclusion in a cloud chamber represent the computing resources and the computing flows that are associated with them that the user wishes to protect via the system.

In some cases, there can be items not included for protection in the cloud chamber. For example, one reason why a server defined in the application profile would not be included in the cloud chamber definition may be when the administrator wants to take the group out of security protection temporarily to facilitate access to the server for maintenance purposes.

Another reason is that the server may be under a different security protection or ownership where a firewall through the system is not necessary or practical. For example, the protection of a particular component such as a database may be the responsibility of the cloud services provider. In this case, the database component may not be selectable for inclusion in the cloud chamber or may be excluded from the cloud chamber. The component may not be provisioned with a system-provided agent, firewall enforcer, or system-supported operating system that allows the component to be included in the cloud chamber.

Despite, however, a particular component being excluded from the chamber, some level of protection is still available because an IP address associated with the component can be included in a firewall rule for an item (e.g., virtual machine) in the cloud chamber. The firewall rule can include the IP address associated with the component to, for example, filter the connections that are allowed to the component, filter the connections coming from the component, or both.

Alternatively, as another example, there can be a component such as a virtual network storage device implemented as a server having system-supported software (e.g., system-supported operating system) that is selected for inclusion in the cloud chamber. When the device is instantiated, the firewall generator can generate firewall rules for that component and push the firewall rules to that component in the cloud chamber.

Consider, as an example, an application profile specifying a computing flow where a server group connects to the component. After provisioning there are three virtual machines provisioned into the server group, each virtual machine having been assigned IP address as a result of the provisioning. In this example, the component may be provided with three firewall rules to allow connections from the each of the three virtual machines in the server group. For example, a first firewall rule may include as a permitted source an IP address assigned to the first virtual machine in the server group. A second firewall rule may include as a permitted source an IP address assigned to the second virtual machine in the server group. A third firewall rule may include as a permitted source an IP address assigned to the third virtual machine in the server group.

In an embodiment, the cloud chamber is a "logic" boundary that includes one or more computing tiers, server groups, components, or combinations of these defined in the application profile. All servers in the server groups, the components, and the computing flows connecting them in a cloud chamber are then protected by cloud firewalls. In a specific implementation, a cloud firewall is created in each one of the servers and components as long as the components are implemented by an operating system (OS) recognized by the system. The cloud firewall includes the firewall rules to allow the defined computing flows that are connecting from a particular server or component to other neighbors (e.g., other groups or tiers), with the source and destination IP lock. With all the involved servers and components with source and destination IP lock, this firewall system forms a strongly connected graph or a partially connected graph for security interlock.

In a specific implementation, if a server group is defined as a "connected server group," then all servers inside the same server group can connect to each other; therefore, a firewall rule can be available to allow such as connection. If a server group is defined as a "silo server group," all neighbors in such a server group cannot connect to each other; therefore, the firewall rule that allows the communication may not be defined. In a specific implementation, the subnet component may not have a cloud firewall, since it is simply a network definition. However, its IP address range may be included in the firewall rules for interlock in the virtual machines that connect to this subnet component. If a database or a load balancer is implemented out of an OS-based server, the system can generate a cloud firewall for such a component. Their IP address information may be included in the firewall rules for interlock in the virtual machines that connect to these components.

The cloud chamber definition module may provide a user interface where the administrator can select the computing resources (e.g., virtual machines computing tiers or groups) to include in a cloud chamber. Instead or additionally, the definition module may provide an upload function where the administrator can upload or import a cloud chamber definition file to the system.

Table B below shows an example of a cloud chamber definition that may be provided to the system as an XML formatted file.

TABLE B

```
<?xml version=" 1.0" encoding="UTF-8"?>
<cloud-chamber-definition>
    <chamber-name>chamber-1</chamber-name>
    <chamber-items>
        <name>tier-2</name>
    </chamber-items>
</cloud-chamber-definition>
```

The cloud chamber definition above is formatted as XML file. From the example above, tier-2 has been identified or selected to be included in a cloud chamber named "chamber-1." The cloud chamber definition can be provided to the system as a text file. It should be appreciated, however, that the cloud chamber definition file, application profile, or both may be structured or formatted using any type of markup language or may be written using a programming language or object-oriented programming language such as C++, Objective-C, Smalltalk, Java, C#, Perl, Python, Ruby and PHP.

In a step 820, virtual machines are provisioned into the various server groups, tiers, or both that have been specified in the application profile. During the provisioning, identifiers such as Internet Protocol (IP) addresses are assigned to the various machines. The tasks involved in provisioning can include, for example, leasing and scheduling machines from the cloud services provider, directing the installation of a particular operating system, application components, and other software on the machine, directing the configuration of various settings on the machine, identifying the amount of resources a machine should have (e.g., memory or storage), and the like.

In a specific implementation, provisioning the virtual machines can be performed through the system. In this specific implementation, the system includes a cloud manager module that can make the appropriate calls to application programming interfaces (APIs) provided by the cloud services provider. In another specific implementation, the provisioning is external to the system. In this specific implementation, identifiers assigned to the provisioned machines (e.g., IP address) can be obtained programmatically after virtual machines have been created or instantiated.

Figure 9:
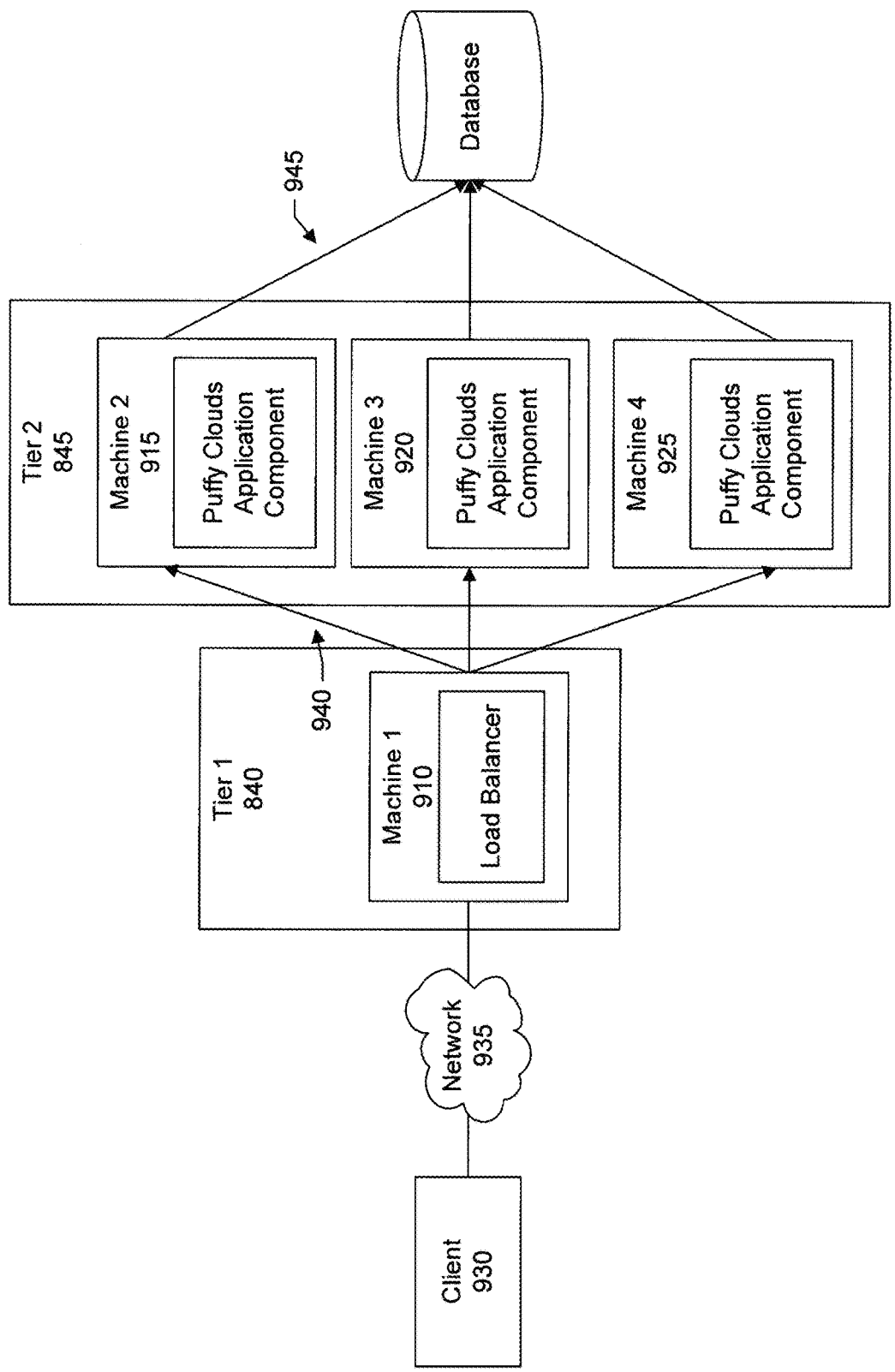
FIG. 9 shows an example of an application deployed in a cloud.

FIG. 9 shows an example of the computing environment in FIG. 8B having been provisioned with the various virtual machines to support the deployment of the PuffyClouds application. As shown in the example of FIG. 9, a virtual machine 910 has been provisioned into the first tier. Virtual machines 915, 920, and 925 have been provisioned into the second tier. More particularly, a load balancer has been deployed on virtual machine 910. A copy of the application presentation component has been installed on each of three virtual machines 915, 920, and 925.

The lines interconnecting the application components represent some of the computing flows. For example, lines 940 represent the first computing flow where the load balancer connects to the presentation machines using TCP with port 5000 according to the application profile in table A. Lines 945 represent the second computing flow where the presentation machines connect to the database component having IP address IP1 using TCP with port 6000 according to the application profile. A client 930 can connect to the application via a network 935.

In a specific implementation, the chamber definition is created before the administrator allocates any virtual machines to the application profile. Therefore, in this specific implementation, the definition of chamber will not and cannot include the instance of virtual machines (since they are not allocated yet). In this specific implementation, the application profile is also defined before the provisioning or leasing of the specific virtual machines for the application.

In a step 825, based on the computing flows specified in the application profile and the identifiers (e.g., IP addresses) assigned to the virtual machines, the system can dynamically or automatically generate firewall rules for each virtual machine in the cloud chamber. In a specific implementation, the application profile and cloud chamber definition phases involve user interaction and input. Once the application profile and cloud chamber has been defined and the virtual machines provisioned, the firewall generation rule phase can occur dynamically or automatically without or with relatively little user input. The automatic generation of the firewall rules using the application profile helps to speed the deployment of a firewall for the application and avoid human errors.

The architecture of the system allows for the automatic generation of firewall rules in a cloud-computing environment where, for example, the connection sources and connection destinations can be dynamically changing. That is, virtual machines can be continuously scheduled into and out of the cloud. By examining and analyzing the computing flows in the application profile, however, the system can rapidly and automatically generate the appropriate firewall rules to ensure protection of new resources provisioned into the server groups defined in the application profile and update the rules when resources are removed from the server groups defined in the application profile.

In other words, the application profile can be considered as a relatively static document through which various server groups and computing flows involving the server groups are defined. The relationships between the server groups typically do not change. What can change, however, are the resources (e.g., virtual machines) provisioned into the server groups during production. The system, by using the computing flows identified in the application profile and receiving or obtaining the IP addresses of machines when they are provisioned into the server groups, can automatically generate the appropriate firewall rules for the newly added machines.

In a specific implementation, the firewall rule generator obtains the IP address of the provisioned virtual machines via an agent or software daemon that is installed on the virtual machine during the provisioning process. The agent is configured to send the generator a message including an identifier (e.g., IP address) that is assigned to the virtual machine. The message may include a tag, flag, or other piece of information that identifies the server group or computing tier that the virtual machine has been provisioned into. In another specific implementation, the system may obtain the identifier (e.g., IP address) by requesting the identifier from the cloud services provider. For example, the system may make a call to an API provided by the cloud services provider in order to request the identifier.

The firewall rules may be generated for virtual machines of a server group included in the cloud chamber. Firewall rules may be generated for virtual machines of a computing tier included in the cloud chamber. Firewall rules may be generated for components included in the cloud chamber. The process of generating the firewall rules relies upon the identifiers assigned to the virtual machines during the provisioning process. In a specific implementation, the identifiers include the IP addresses assigned to the virtual machines during the provisioning process. An identifier, however, can include any piece of information or unit of data that helps to identify a particular virtual machine, device, or component.

In an implementation, firewall rules are not generated for items not included in the cloud chamber. For example, as discussed above, the protection of some items specified in an application profile such as a database may be the responsibility of the cloud services provider. In this case, the item when provisioned may not include an operating system or other software modules required by the system. In this case, firewall rules will not be generated by the system for such items. If such an item is selected for inclusion in a cloud chamber, the system may generate an alert indicating that the item cannot be added to the cloud chamber.

In a specific implementation, the system upon receiving the application profile and an indication of the tiers or groups of the virtual machines to include in a cloud chamber analyzes the application profile and cloud chamber definition to generate a set of firewall rules according to the security policies of the enterprise. In a specific implementation, the firewall rules generator includes an XML parser or processor. The XML processor can translate the application profile and the cloud chamber definition into programmatic commands used to create the firewall rules.

In a specific implementation, both the cloud chamber definition and the application profile definition are needed or used to generate the firewall rules for all VMs in the cloud chamber. This is because the application profile defines all tier groups and the computing flows connecting them. The chamber definition then defines what tiers (or groups) or components are in the chamber. With both definitions together, when a VM is provisioned in the system, the system can find all "neighbors" for the VM and the involved computing flows to generate firewall rules explicitly.

In other words, the application profile defines the tiers or server groups along with other components and computing flows that connect them. The virtual machines are added or deleted later in production. The cloud chamber definition is also defined along with the definition of the application profile. In production, when VMs are added or deleted from the application profile, the system will automatically generate the firewall rules for all VMs based on the definition of application profile and cloud chamber.

In a specific implementation, a flow of generating the firewall rules for all servers and components is as follows. For each say server in each server group (or for each component), a process finds all its "neighbors" in the application profile that are connected to such a server or component via a computing flow. A firewall rule is created with a source and a destination IP lock (that allows such network traffic). Given an application profile, there is a limited amount of servers and components, and the process includes linearly reviewing all components to create firewall rules.

In a specific implementation, a method includes examining a cloud chamber and determining that a first server group, having been provisioned with a first virtual machine, was selected to be included in the cloud chamber, examining an application profile and determining that a second server group, having been provisioned with a second virtual machine, connects to the first server group, obtaining, receiving, or requesting an IP address assigned to the second virtual machine, and inserting, placing, adding, injecting, or including the IP address into a firewall rule for the first virtual machine to allow the first virtual machine to receive a connection from the second virtual machine.

In another specific implementation, a method includes examining a cloud chamber and determining that a first server group, having been provisioned with a first virtual machine, was selected to be included in the cloud chamber, examining an application profile and determining that the first server group connects to a second server group, the second server group having been provisioned with a second virtual machine, obtaining an IP address assigned to the second virtual machine, and inserting the IP address into a firewall rule for the first virtual machine to allow the first virtual machine to initiate connections to the second virtual machine.

As discussed above, the computing flow is part of the application profile, which defines how the "application" will work. The application profile typically defines all "legal" computing flows (e.g., a white list). In this regard, when a computing flow is not defined in the application profile, the firewall rule will not allow this traffic. In other words, when a connection is received at a virtual machine in the cloud chamber, the connection data is compared to a firewall rule. If the connection data matches the rule the connection may be allowed. If the connection data does not match the rule the connection may be blocked. The connection data can include, for example, the source IP address of the object that is requesting the connection. In this example, the virtual machine represents the destination of the connection. This firewall rule is an example of a firewall rule that secures incoming network traffic.

As another example, when a virtual machine in the cloud chamber attempts to make a connection to a destination object, the connection data is compared to a firewall rule. If the connection data matches the rule the connection may be allowed. If the connection data does not match the rule the connection may be blocked. The connection data can include, for example, the destination IP address of the object that the virtual machine is attempting to connect with. In this example, the virtual machine represents the source of the connection. This firewall rule is an example of a firewall rule that secures outgoing network traffic.

Consider, as another example, a scenario where a cloud chamber is defined to include two tiers (or groups) of servers. A computing flow in an application profile specifies that the tier1 can initiate a TCP with port 5000 connecting to tier2. When the operations start, the administrator starts to lease virtual machines. The administrator places VM1 and VM2 into tier1 and VM3 and VM4 into tier2. Now, based on the definition of application profile, VM3 and VM4 are the "neighbors" to VM1. VM3 and VM4 are also "neighbors" to VM2. Assume tier1 is "silo." Then, VM2 is not the neighbor to VM1. Assume tier2 is "connected." Then VM1, VM2, VM4 are all "neighbors" to VM3. VM1, VM2, and VM3 are "neighbors" to VM4.

In a specific implementation, this "neighbor" relationship only starts to happen in the operations (i.e., the provisioning of VM happens in the operations phase, and not in the phase of creating the definition of application profile, computing flow, and cloud chamber definition).

In a specific implementation, generating firewall rules includes examining a first computing flow specified in the application profile, determining from the examination that the virtual machines provisioned into the first server group receive data from the virtual machines provisioned into the second server group, receiving from an agent installed on a virtual machine in the second server group a message including an IP address assigned to the virtual machine in the second server group, and generating a firewall rule for each virtual machine in the first server groups included in the cloud chamber. The first firewall rule includes the IP address assigned to the virtual machine provisioned into the second server group to allow the virtual machines in the cloud chamber to receive data from the virtual machine provisioned into the second server group.

In another specific implementation, generating firewall rules includes examining a first computing flow specified in the application profile, determining from the examination that the virtual machines provisioned into the first server group send data to the virtual machines provisioned into the second server group, receiving from an agent installed on a virtual machine in the second server group a message including an IP address assigned to the virtual machine in the second server group, and generating a firewall rule for each virtual machine in the first server group included in the cloud chamber. The first firewall rule includes the IP address assigned to the virtual machine provisioned into the second server group to allow the virtual machines in the cloud chamber to send data to the virtual machine provisioned into the second server group. The agents may be software components, modules, or daemons that are installed on the virtual machines during the provisioning of the virtual machines. See U.S. patent application Ser. No. 14/187,091 for an additional discussion of agents.

The computing flows specified in an application profile are converted or translated into firewall rules. In a specific implementation, the system provides for the authoring of additional or separate security policies that can be attached to the application profile for the generation of additional firewall rules and actions when the rules are or are not satisfied. These additional firewall rules can augment or supplement the actions to be applied when particular connections are made.

For example, the application profile may specify a computing flow is from a first server group to a component (or other server group). A firewall rule may then be created that allows data to be sent from the first server group to the component. There can, however, be a separate security policy that specifies certain actions to be applied when the firewall rule is (or is not) satisfied.

The policy may specify that the connection to the component be logged. It may be desirable, to log information about such connections to the component if, for example, the component is associated with a critical subnet or resource (e.g., corporate research and development). The log information can include, for example, a timestamp associated with the connection, a user name associated with the connection, signatures, and other connection details. The log can then be reviewed for patterns of suspicious activity and behavior. Instead or additionally, the log may be reviewed to help optimize the performance of the application. An action to apply can include logging the connection, generating an alert, directing or forwarding the connection to a quarantine area or security server for monitoring, or combinations of these.

In a specific embodiment, there are first, second, and third types of computing flows. The first type of computing flow is allowed and may be referred to as a regular, normal, or typical computing flow that may be defined in the application profile.

The second type of computing flow is allowed and may be referred to as a security computing flow. For the security computing flow the traffic may be allowed, but may be routed to a different server group (e.g., security server group) for monitoring behavior and capturing signatures. The security computing flow may be defined in a security policy that is separate from the application profile.

The third type of computing flow may be referred to as a blocking flow. Traffic matching or corresponding to the blocking flow may be blocked from reaching a particular destination. Actions can be applied when traffic matching a blocking flow is detected. Such actions can include, for example, alerts and logging of the attempted connections or locking the source server in a quarantine area for security screening. These actions can be specified in a security policy separate from the application profile.

Different cloud service providers may have different requirements on how an application profile is to be structured. For example, the syntax requirements for AWS (Amazon Web Services) may be different from the syntax requirements for Microsoft Azure. So, the XML processor may include different processing templates that correspond to the different requirements of various cloud service providers. In a specific implementation, the system can inspect an application profile and automatically determine and select the appropriate processing template. In another specific implementation, the administrator may provide a manual indication to the system of the appropriate template for processing the application profile.

In a step 830, the system distributes the firewall rules to the virtual machines in the cloud chambers. The firewall rules can be transmitted to each virtual machine in the server group or computing tier or compatible component selected to be included in the cloud chamber. In a specific implementation, firewall rules are distributed to each virtual machine within a cloud chamber. This allows a virtual machine to filter network traffic at the virtual machine. In other words, network traffic is filtered at a particular virtual machine rather than at a central location. Bottlenecking is reduced since traffic is not routed to or from a central location.

Figure 10:
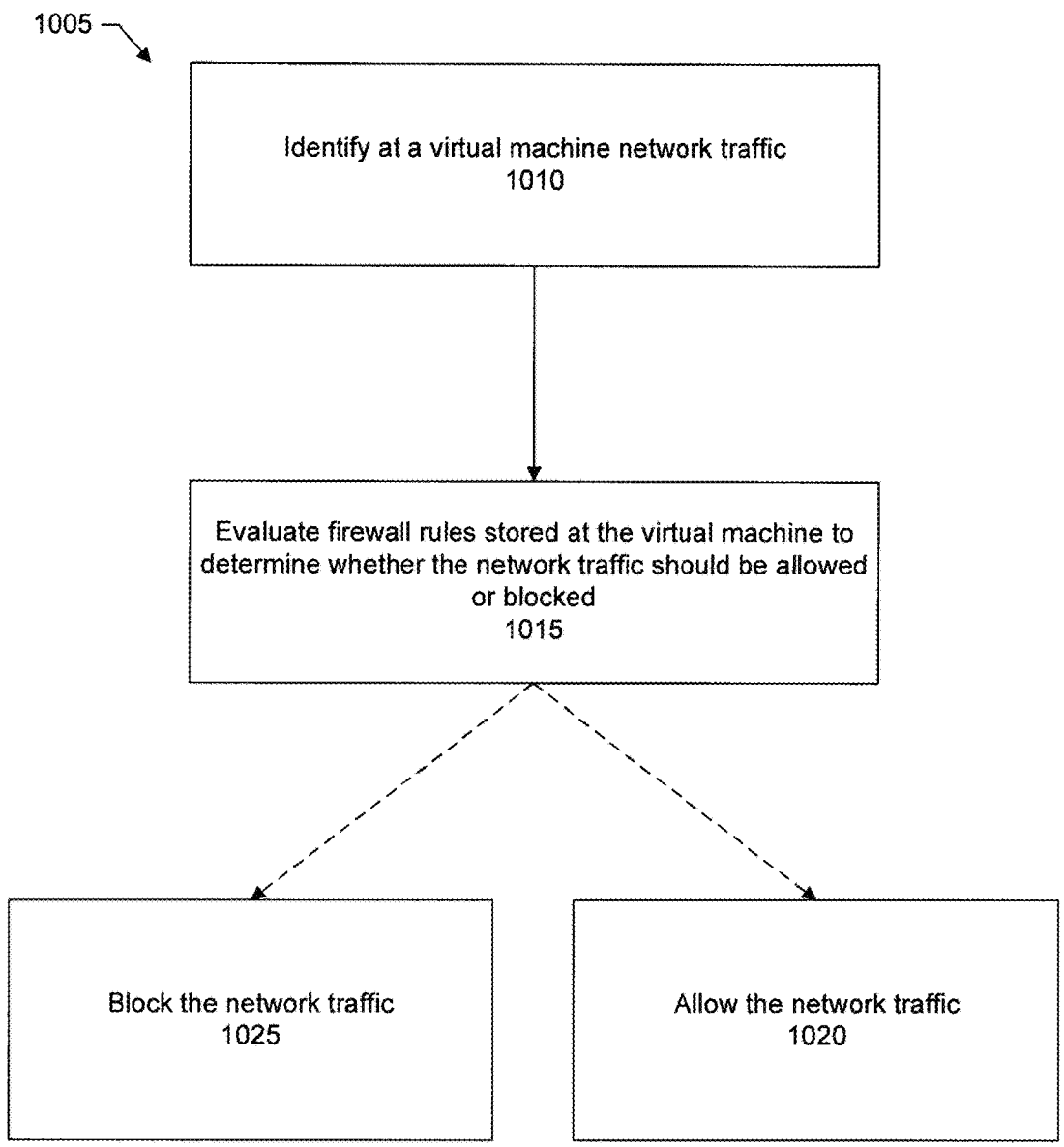
FIG. 10 shows a flow diagram for enforcing firewall rules at a virtual machine in a cloud chamber.

More particularly, as shown in FIG. 7 and discussed above, a firewall enforcer at a virtual machine is responsible for enforcing the firewall rules that have been distributed to the virtual machine. FIG. 10 shows an example of a flow 1005 for firewall enforcement at a virtual machine. In a step 1010, network traffic (e.g., a data packet or connection) is identified at a virtual machine. The network traffic can be inbound traffic, i.e., data sent to the virtual machine. The network traffic can be outbound traffic, i.e., data sent from the virtual machine.

In a step 1015, the firewall enforcer at the virtual machine evaluates one or more firewall rules stored at the virtual machine to determine whether the network traffic should be allowed (step 1020) or blocked (step 1025). A firewall rule may be formatted or structured as <source> <destination> <action>. The source field includes information identifying the source of a data packet. The destination field includes information identifying the destination of the data packet. The identifying information can include an IP address. That is, the source field can include the address of the host from which the packet originated. The destination field can include the address of the host the packet is attempting to reach. The action field specifies the action (e.g., allow or block) that the enforcer is to perform when there is a match on the source and destination.

A firewall rule may specify criteria such as the network or transport protocol being used to communicate between the source and destination hosts (e.g., Transmission Control Protocol (TCP), User Datagram Protocol (UDP), or Internet Control Message Protocol (ICMP)), characteristics of the transport layer communications session source and destination ports (e.g., TCP 80 for a destination port belonging to a web server, TCP 1320 for a source port belonging to a personal computing accessing the server), the interface being traversed by the packet, the direction of the packet, or combinations of these.

Firewall rules may be evaluated sequentially by the firewall enforcer. For example, the enforcer may compare information in a data packet to a first rule. If the information matches criteria in the first rule, the enforcer applies an action specified in the first rule. If the information does not match the criteria, the enforcer selects a second rule that is ordered after the first rule.

It should be appreciated that there can be many different types of firewall rules to help protect the enterprise from malware, internal attacks, inadvertent configurations, spoofing, data theft, and so forth. Firewall rules can be used to allow only specific traffic in and out of a cloud chamber or virtual machine within a cloud chamber. Firewall rules can be used to allow only specific traffic to and from a cloud chamber or virtual machine within a cloud chamber.

Depending on factors such as the information in the application profile, the cloud chamber definition, security policies, or combinations of these, firewall rules can be defined such that all or specific types of network traffic are blocked or allowed across a cloud chamber boundary. Firewall rules can be defined such that two or more computing resources (e.g., virtual machines) in a tier or a server group are not allowed to communicate with each other. This type of tier or group of cloud chamber may be referred to as a "silo" server group. Firewall rules can be defined such that two or more computing resources (e.g., virtual machines) in a tier or server group are allowed to communicate with each other. This type of tier or server group may be referred to as a "connected" server group. "Silo" and "connected" can be properties that apply to a server group or tier. A cloud chamber can include several tiers or groups. Computing flows can be defined to address how they can (or cannot) communicate with each other.

Communications between virtual machines in a cloud chamber or virtual machines across two cloud chambers may be restricted, according to the firewall rules, to all or specific types of communications. A set of firewall rules distributed to a virtual machine in a cloud chamber may be different from or the same as a set of firewall rules distributed to another virtual machine in the same cloud chamber. A set of firewall rules distributed to a virtual machine in a cloud chamber may be different from or the same as a set of firewall rules distributed to another virtual machine in a different cloud chamber.

In a specific implementation, the firewall enforcer operates at an operating system level. For example, the firewall enforcer may be in a guest operating system of the virtual machine. The firewall enforcer may be in a host operating system of a physical machine that is hosting the virtual machine. The firewall enforcer may be embedded in an application program. The firewall enforcer may be implemented as an add-in, plug-in, script, macro, library, extension program, filter, or device driver.

In addition to blocking or allowing network traffic, the enforcer may perform other actions in accordance with a cloud firewall when conditions of the firewall rule have (or have not) been satisfied. Such actions can include logging or recording information about the connections in a log, generating alerts, and so forth.

Figure 11:
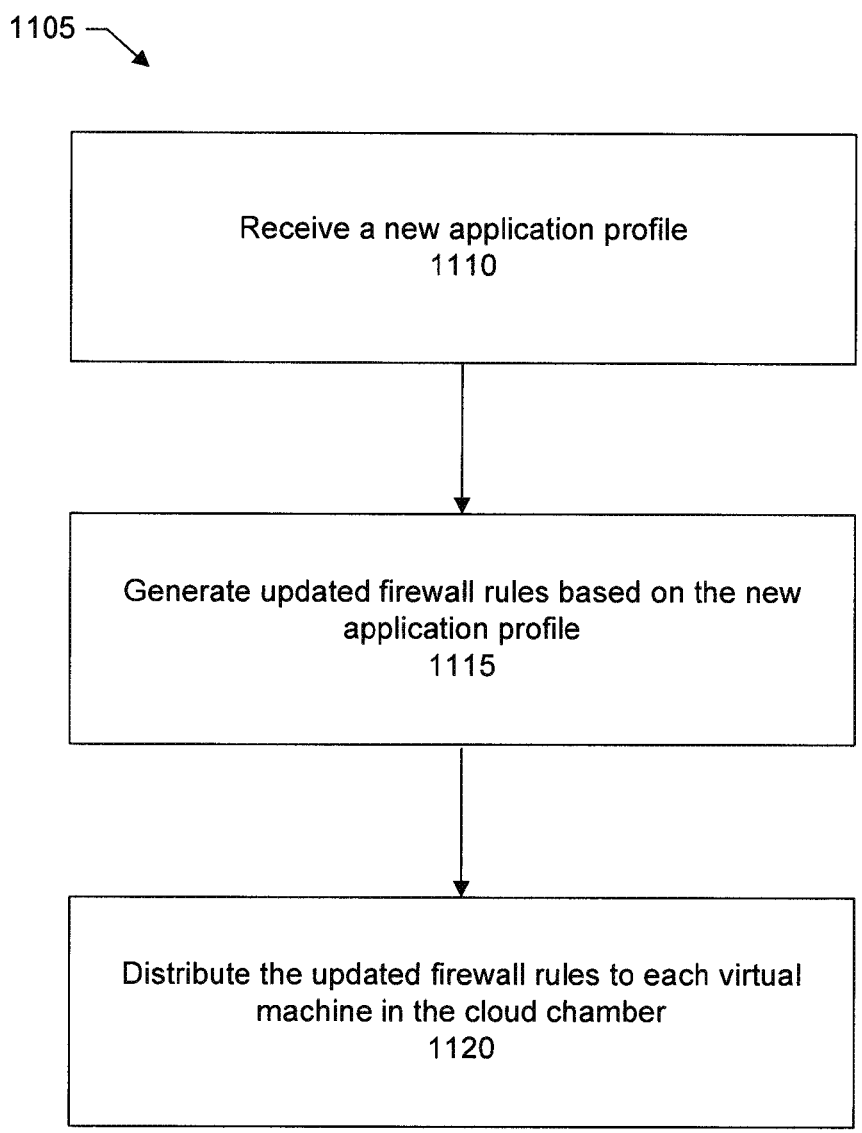
FIG. 11 shows a flow diagram for updating firewall rules for a cloud chamber.

FIG. 11 shows a flow 1105 for updating firewall rules of a cloud firewall. In a step 1110, the system receives a new application profile. The new application profile may include a change in configuration, settings, dependencies, computing flows, deployment requirements, or combinations of these, with respect to the existing or previously received application profile. For example, a new application profile may add a new virtual machine to the environment, delete an existing virtual machine from the environment, add a new server group, add a new computing tier, add a new component, add a new computing flow, modify, change, or alter an existing computing flow, delete an existing server group, delete an existing computing tier, delete an existing component, delete an existing computing flow, or combinations of these.

In a step 1115, the system generates updated firewall rules based on the new application profile. In a specific implementation, a flow for firewall rule updates when adding or deleting a virtual machine in the application profile is as follows. When a virtual machine is added to a server group in an application profile, all neighbors for this new member can be found from the data structure. The system generates the firewall rules for this new virtual machine. The firewall rules for all neighbors can be updated as well. Likewise, a similar method applies to the deletion of a virtual machine in the profile.

Typically, the other components in the application profile are not changing frequently as the virtual machines. However, the same method for updating firewall rules applies to those components if changed.

In a step 1120, the system distributes the updated firewall rules as needed to each virtual machine in the cloud chamber.

Figure 12:
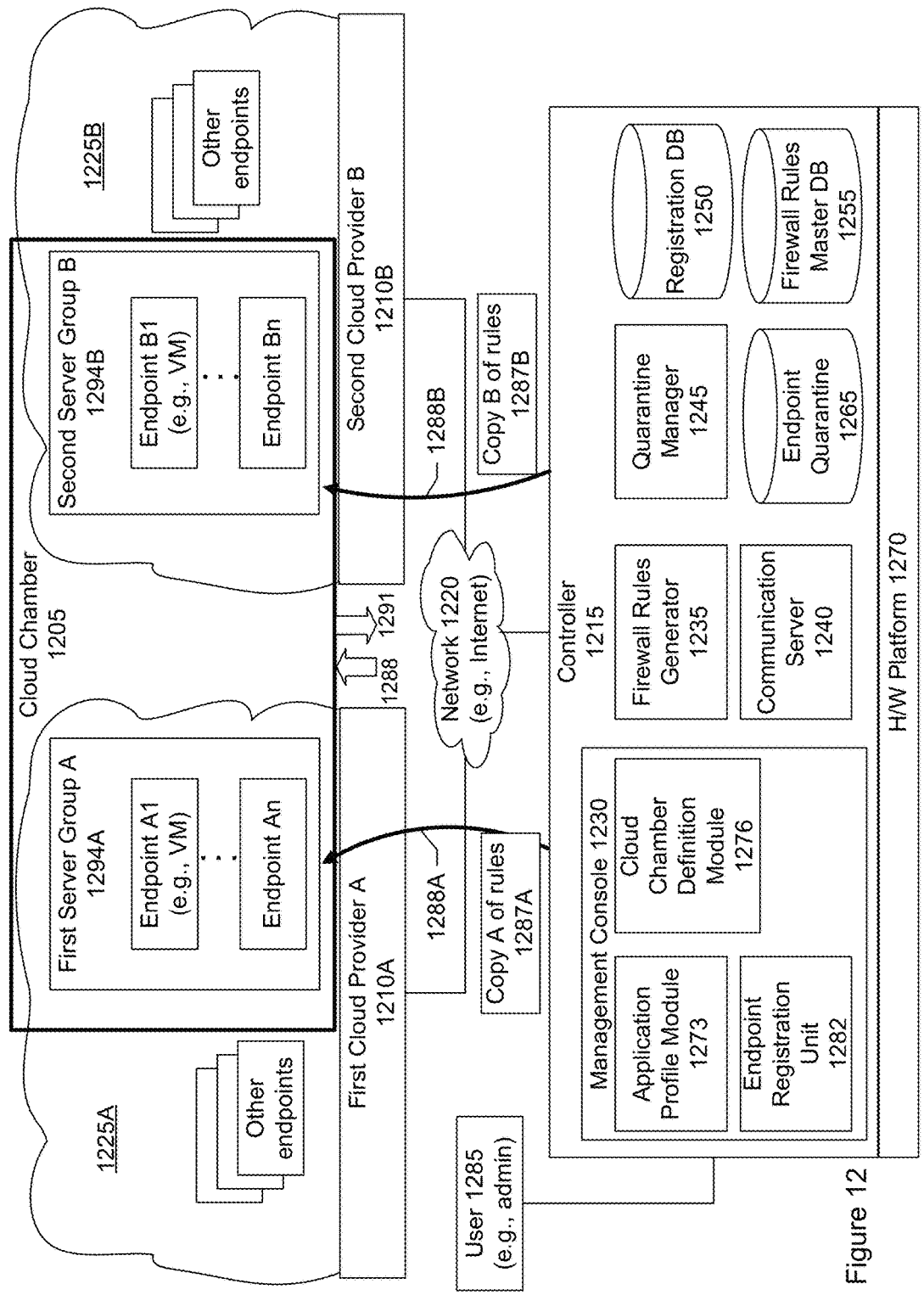
FIG. 12 shows a block diagram of an inter-cloud chamber extending across different cloud computing networks, under some embodiments.

FIG. 12 shows a block diagram of a system having a cloud chamber 1205. This cloud chamber may be referred to as an inter-cloud chamber as it manages firewall rules distributed to endpoints in different cloud computing networks. As shown in the example of FIG. 12, there is a first cloud provider A 1210A, a second cloud provider B 1210B, and a controller 1215, each of which are inter-connected by a network 1220. The network may be as shown in FIG. 1 and described above. In a specific embodiment, the cloud computing networks are remote from each other and the network includes the Internet. The controller may be local to one of the first or second cloud computing networks. The controller may be remote from the first or second cloud computing networks, both. For example, the controller may reside in the datacenter of an enterprise.

The first cloud provider A owns a first cloud computing network 1225A. The second cloud provider B is different from the first cloud provider A and owns a second cloud computing network 1225B. For example, the first and second cloud providers may be competitors (e.g., Amazon AWS versus Google Cloud).

The cloud computing network may include various computing resources that may be leased by an enterprise customer of the cloud provider. The computing resources may include hardware, software, services, physical infrastructure, and so forth. Some specific examples of resources include computing devices, servers, routers, hubs, switches, networking equipment, virtual resources, virtual machines, containers, storage, load balancers, and the like.

In some cases, an enterprise may wish to deploy their application or multi-tier application across multiple (e.g., two or more) cloud computing networks that may be owned by different cloud service providers. There can be many different reasons for such a deployment model. For example, one cloud provider may offer a particular service that another cloud provider does not offer and vice-versa. Distributing the application across different cloud computing networks can also help to ensure continuous availability. For example, if one cloud network suffers a failure, the application may continue to run on the other cloud network.

It can be very difficult and laborious, however, to manage the various firewalls that each cloud service provider may offer. Typically, firewalls are deployed at an edge or perimeter of the network (e.g., between the Internet and cloud network of the cloud provider). A firewall protected region within the cloud network may further be divided into different zones where each zone may also be protected by another firewall. Deploying an application on a single cloud network may then include configuring at least two separate firewalls (e.g., regional firewall and zone firewall).

Deploying the application on a second cloud network can then double the number of firewalls to configure. Further, the cloud providers may have different firewall configuration interfaces, different firewall enforcement models, different programming methods, different implementations, different naming conventions and labels, and so forth. Having to configure multiple firewalls from different cloud vendors that may have different interfaces and different enforcement models can be very time-consuming and frustrating as programming must be duplicated several times. It can be very difficult to maintain consistent firewall policies between two different cloud computing networks hosted by two different cloud providers because there can be multiple regional and zone-based firewalls to program and reprogram.

In an embodiment, systems and techniques are provided to help manage firewalls for an application deployed across two (or more) cloud computing networks. The cloud computing networks may be owned by different (or the same) cloud provider. In a specific embodiment, a user, such as an enterprise administrator, can configure or define the firewall rules for the application from a central location (e.g., central controller). The firewall rules are pushed from the central location to each of the different endpoints in the different cloud networks that are running or supporting the application. The firewall rules are enforced at the endpoints. Configuration is simplified because the administrator can define the firewall rules from a single central location using a single programming methodology provided by the system to manage firewalls for endpoints in different cloud computing networks. That is, firewall rules may be defined a single time though endpoints may be in different cloud networks.

Updates to the firewall rules are also simplified because a single set of firewall rules can be maintained for endpoints even though some endpoints may be in different cloud networks as compared to other endpoints. For example, a firewall rule update or new firewall rule defined at the controller for a particular cloud chamber can be automatically pushed to each endpoint belonging to that particular cloud chamber. In an embodiment, the endpoint agents are configured to interlock with the controller. That is, firewall rules and other firewall rule updates are authorized only if they are from the controller. The firewall may be referred to as an endpoint firewall or personal firewall.

More particularly, as shown in the example of FIG. 12, the controller may include a management console 1230, a firewall rules generator 1235, a communication server 1240, a quarantine manager 1245, and storage including a registration database 1250, firewall rules or policies repository 1255, and endpoint quarantine database 1265. The controller may include executable code (or computer-readable code) that is executed by a computer. The computer may include hardware and software components as described. For example, a hardware platform 1270 may include a processor, memory, storage, and so forth.

The management console includes an application profile module 1273, cloud chamber definition module 1276, and endpoint registration and provisioning unit 1282. The management console can provide an interface through which a user (e.g., administrator) 1285 can use to define an application profile for an application, define a cloud chamber, author firewall rules for the chamber, and provision and register endpoints in the chamber.

As discussed, the application profile module provides an interface through which the administrator can specify server groups or tiers of endpoints, components, services, and computing flows supporting the application. The interface may include a GUI or programmatic interface (e.g., application programming interface or API). The administrator can use the cloud chamber definition module to define in the application profile a cloud chamber and, more particularly, select or identify the server groups or groups of endpoints to be included in the cloud chamber, computing flows 1288 to the cloud chamber (e.g., inbound flows to the cloud chamber), and computing flows 1291 from the cloud chamber (e.g., outbound flows from the cloud chamber).

In a specific embodiment, the cloud chamber includes a first server group A 1294A from first cloud computing network A provided by first cloud provider A, and a second server group 1294B from second cloud computing network B provided by second cloud provider B.

Table C below shows an example of an application profile, including cloud chamber, for an application named "MarshmallowClouds".

TABLE C

```
<?xml version="1.O" encoding="UTF-8"?>
<cloud-application-configuration>
    <application-name>MarshmallowClouds</application-name>
    <server groups>
        <group-1>
            <name>first server group A</name>
        </group-1>
        <group-2>
            <name>second server group B</name>
        </group-2>
        <group-3>
            <name>third server group C</name>
        </group-3>
    </groups>
    <cloud-chamber-definition>
        <chamber-name>chamber-1</chamber-name>
        <chamber-items>
            <name>first server group A</name>
            <name>second server group B</name>
        </chamber-items>
    </cloud-chamber-definition>
        <blacklisted-computing-flows>
            <first-blacklisted-flow>
                <from>third server group C</from>
                <to>chamber-1</to>
                <protocol>TCP</protocol>
                <port>5000</port>
            </first-blacklisted-flow>
            <second-blacklisted-flow>
                <to>chamber-1</to>
                <protocol>TCP</protocol>
                <port>529</port>
            </second-blacklisted-flow>
            <third-blacklisted-flow>
                <to>chamber-1</to>
                <protocol>IPX</protocol>
            </third-blacklisted-flow>
            <fourth-blacklisted-flow>
                <from>chamber-1</from>
                <to>database</to>
                <IP-address>database IP address</IP-address>
            </fourth-blacklisted-flow>
        </blacklisted-computing-flows>
</cloud-application-configuration>
```

As shown in the example of table C above, the application profile for the application specifies first, second, and third server groups A, B, and C, respectively, and a cloud chamber as including first server group A and second server group B. The application profile specifies a first computing flow as being from third server group C to the cloud chamber using protocol TCP and port 5000; a second computing flow as being to the cloud chamber using TCP and port 529; a third computing flow as being to the cloud chamber using the IPX protocol; and a fourth computing flow as being from the cloud chamber to the database at the IP address "database IP address."

In this example, the computing flows are identified as blacklisted computing flows, i.e., specific computing flows that are not allowed. An application profile may instead or additionally specify whitelisted computing flows, i.e., specific computing flows that are allowed. In various specific embodiments, the system can be configured so that the computing flows specified in the application profile are blacklisted flows; and flows that are otherwise not specified in the application profile are allowed by default. The system can be configured so that the computing flows specified in the application profile are whitelisted flows; and flows that are otherwise not specified in the application profile are not allowed by default.

Factors an enterprise might consider in determining whether to provide a blacklist by default or a whitelist by default may include the number of applications the enterprise wishes to deploy into the cloud, desired level of security, type of information to be protected, administrative resources available, and so forth. For example, implementing a whitelist by default may be desirable in cases when there are relatively few applications to be deployed and the enterprise wishes to have very tightly controlled security. As the number of applications increase, however, an enterprise may instead desire a blacklist by default so as to potentially reduce the number of firewall rules to manage.

Parameters for a computing flow may include an identification of a server group, cloud chamber, protocol, component, source port number, destination port number, direction (e.g., inbound or outbound), source IP address, destination IP address, source subnet, destination subnet, action, or combinations of these.

The endpoint registration unit is responsible for coordinating and interfacing with the cloud providers to provision the endpoints (e.g., virtual machines, containers, and so forth) in the cloud computing networks; and registering the endpoints according to the application profile. For example, based on the application profile, an endpoint may be associated with a particular server group, the particular server group may be within a particular cloud computing network hosted by a particular cloud provider and associated with a particular cloud chamber. The registration information may be stored in the registration database.

Table D below shows an example of information that may be stored in the registration database.

TABLE D

| Endpoint | Server Group | Cloud Network | Cloud Chamber |
|---|---|---|---|
| IP address A1 | First server group A | First cloud network A | Cloud Chamber-1 |
| IP address A2 | First server group A | First cloud network A | Cloud Chamber-1 |
| IP address A3 | First server group A | First cloud network A | Cloud Chamber-1 |
| IP address A4 | Fifth server group E | First cloud network A | Cloud Chamber-7 |
| IP address B1 | Second server group B | Second cloud network B | Cloud Chamber-1 |
| IP address B2 | Second server group B | Second cloud network B | Cloud Chamber-1 |
| IP address B3 | Sixth server group F | Second cloud network B | Cloud Chamber-8 |

As shown in the sample data of table D above, endpoints having IP addresses A1, A2, and A3, respectively, are in first server group A. The first server group A is within the first cloud network A and in cloud chamber-1. An endpoint having an IP address A4 is in fifth server group E. The fifth server group E is within the first cloud network A and in cloud chamber-7. Endpoints having IP addresses B1 and B2, respectively, are in second server group B. The second server group B is within the second cloud network B and in cloud chamber-1. The endpoint having IP address B3 is in sixth server group F. The sixth server group F is within the second cloud network B and in cloud chamber-8.

As discussed, the firewall rules generator is responsible for processing the application profile to generate firewall rules. Table E below shows some firewall rules that may be processed based on the example of the application profile shown in table C.

TABLE E

| Rule | Source | Source Port | Destination | Destination Port | Protocol | Action |
|---|---|---|---|---|---|---|
| 1 | third server group C | any | cloud chamber-1 | 5000 | TCP | Deny |
| 2 | any | any | cloud chamber-1 | 529 | TCP | Deny |
| 3 | any | any | cloud chamber-1 | any | IPX | Deny |
| 4 | cloud chamber-1 | any | db IP address | any | any | Deny |

As shown in the example of table E above, a first column identifies the firewall rule. A second column identifies the source of the data packet. A name of the source (e.g., "third server group C") may be cross-referenced with the registration database to identify the endpoints (e.g., endpoint IP addresses) in the group. A third column identifies the source port. A fourth column identifies the destination of the data packet. A name of the destination (e.g., "cloud chamber-1") may be cross-referenced with the registration database to identify the endpoints (e.g., endpoint IP addresses) in the group.

For example, based on the sample data from table D above, "cloud chamber-1" includes endpoints having IP address A1, IP address A2, IP address A3, IP address B1, and IP address B2. Endpoints IP addresses A1-A3 are in first server group A from the first cloud network A. Endpoint IP addresses B1-B2 are in second server group B from the second cloud network B. A fifth column identifies the destination port. A sixth column identifies the protocol. A seventh column identifies the action (e.g., deny data packet or allow data packet).

Upon generation of the firewall rules, the communication server distributes or transmits the firewall rules from the controller to the cloud chamber—or, more particularly, to each server group of endpoints in the cloud chamber. As shown in the example of FIG. 12, a first copy 1287A of the relevant firewall rules is distributed 1288A to the endpoints in the first server group A of the cloud chamber. A second copy 1287B of the rules is distributed 1288B to the endpoints in the second server group B of the cloud chamber. In other words, in a specific embodiment, the firewall rules distributed to the cloud chamber endpoints in the different cloud networks are the same, are copies of each other, or are identical.

For example, a firewall rule distributed to an endpoint A1 in the first server group A of the cloud chamber may be the same as a firewall rule distributed to an endpoint B1 in the second server group B of the cloud chamber. A firewall rule received at endpoint A1 in the first server group of the cloud chamber from the controller may be the same as a firewall rule received at endpoint B1 in the second server group of the cloud chamber. Thus, the endpoints may be in different cloud computing networks provided by different cloud providers, but may be interlocked together. In other words, the endpoints in the different cloud networks may be regulated by or subjected to the same firewall rules.

Consider, as an example, that a cloud chamber has been defined to include endpoints A1, and B1, where endpoint A1 is in a first cloud computing network provided by a first cloud provider, and endpoint B1 is in a second cloud computing network provided by a second cloud provider, different from the first cloud provider. A firewall rule of the cloud chamber specifies that endpoint A1 should not be allowed to send packets to or receive packets from a virtual machine C which is outside the cloud chamber. In this example, endpoint B1 is subject to the same firewall rule. The same firewall rule applies to endpoint B 1. Specifically, endpoint B1 is also not allowed to send packets to or receive packets from virtual machine C because endpoint B1 is in the same cloud chamber as endpoint A1.

As another example, consider that the firewall rule specifies that endpoint A1 can receive traffic from virtual machine C from source port 80. Endpoint B1 is subject to the same firewall rule. That is, endpoint B1 may also receive traffic from virtual machine C from source port 80 because endpoint B1 is in the same cloud chamber as endpoint A1.

In an embodiment, the administrator user can configure the firewall rules at the controller. The controller may receive from the administrator input indicating that traffic from certain ports, IP addresses, IP subnets, protocols, or combinations of these should not (or should) be accepted or should be denied (e.g., block port 529 traffic; block VRRP (Virtual Router Redundancy Protocol) traffic; block UDP (User Datagram Protocol) traffic; block IPX in IP traffic). Some protocols may be less secure than other protocols. So, the administrator can define via the controller that certain protocols should be blocked. The firewall rules are then pushed from the controller to each endpoint belonging to the cloud chamber.

Figure 13:
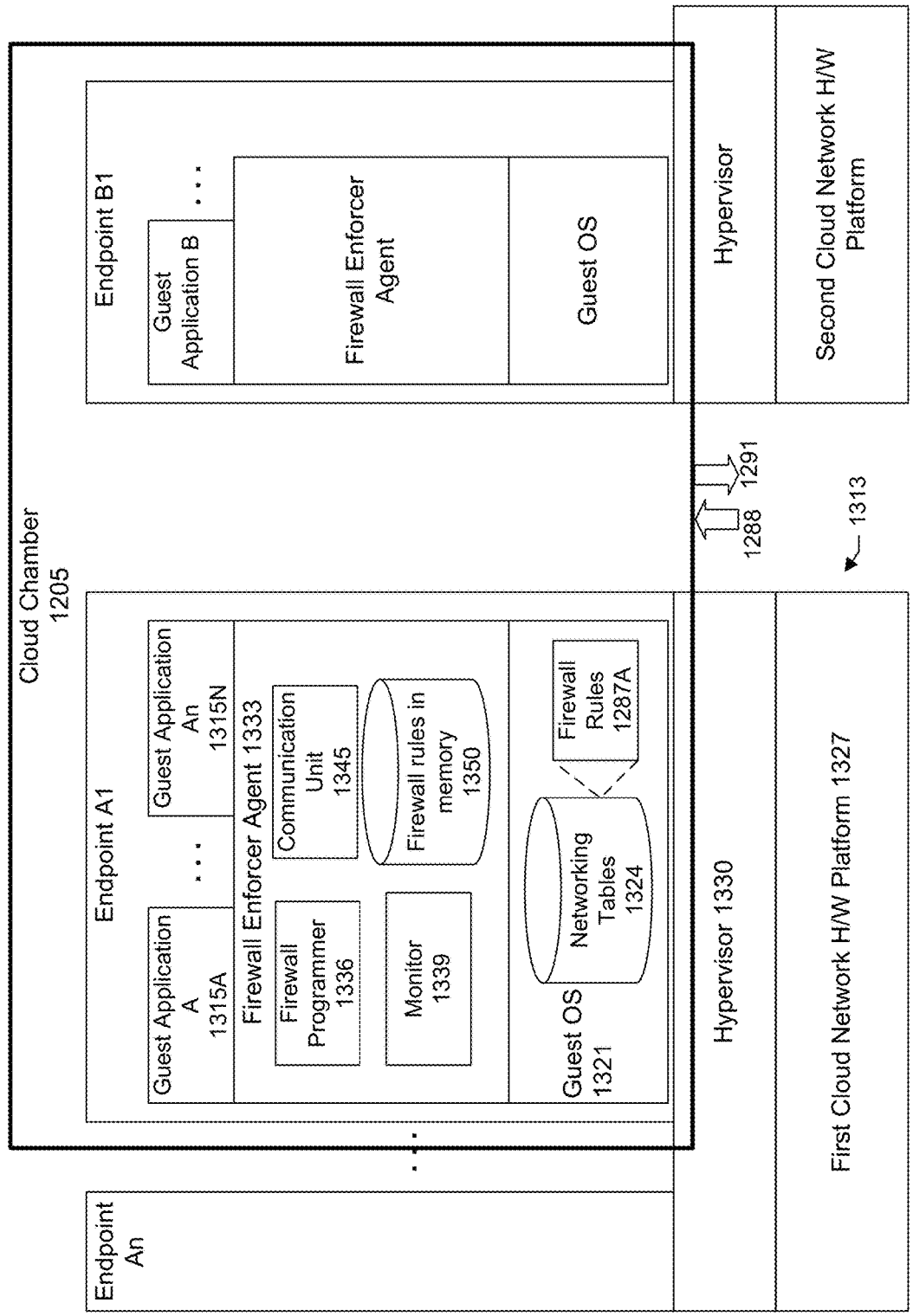
FIG. 13 shows a block diagram of endpoints in the inter-cloud chamber, under some embodiments.

In an embodiment, the firewall rules are applied, evaluated, or enforced at the endpoints. FIG. 13 shows a more detailed block diagram of the endpoints and cloud chamber shown in FIG. 12. In the example shown in FIG. 13, an endpoint, such as endpoint A1, is a virtual machine running on a host 1313. The host may host any number of virtual machines (or containers, or both). A virtual machine may include any number of guest applications 1315A-N and a guest operating system 1321. The guest operating system includes a networking kernel or tables 1324.

The host may be a general purpose computer including physical hardware 1327. The physical hardware may include a processor, memory, storage (e.g., hard disk, flash storage), network interface, I/O controller, and the like, each of which may be interconnected by a bus architecture of the host system. The host includes virtualization software such as a hypervisor 1330. The hypervisor provides an abstraction of the underlying hardware to the virtual machines and helps to ensure isolation of the hosted VMs.

Each endpoint, such as endpoint A1, is provisioned with a firewall enforcer or agent 1333. The agent includes a firewall programmer 1336, monitor 1339, and communication unit 1345. The communication unit is responsible for maintaining a live continuous or substantially continuous connection with the controller (or controller communication server). For example, the communication unit may repeatedly ping the controller (or vice-versa) such as every 3 seconds or any other frequency as desired. If connectivity between the controller and a particular endpoint is lost, the controller may generate an alert or other notification to the administrator so that the administrator may investigate. Thus, even if a hacker or other malicious tool is able to penetrate the endpoint and kill the endpoint agent, the controller is alerted based on the interruption in the connection between the controller and endpoint agent. The controller can then undertake countermeasures to quarantine the compromised endpoint.

Figure 14:
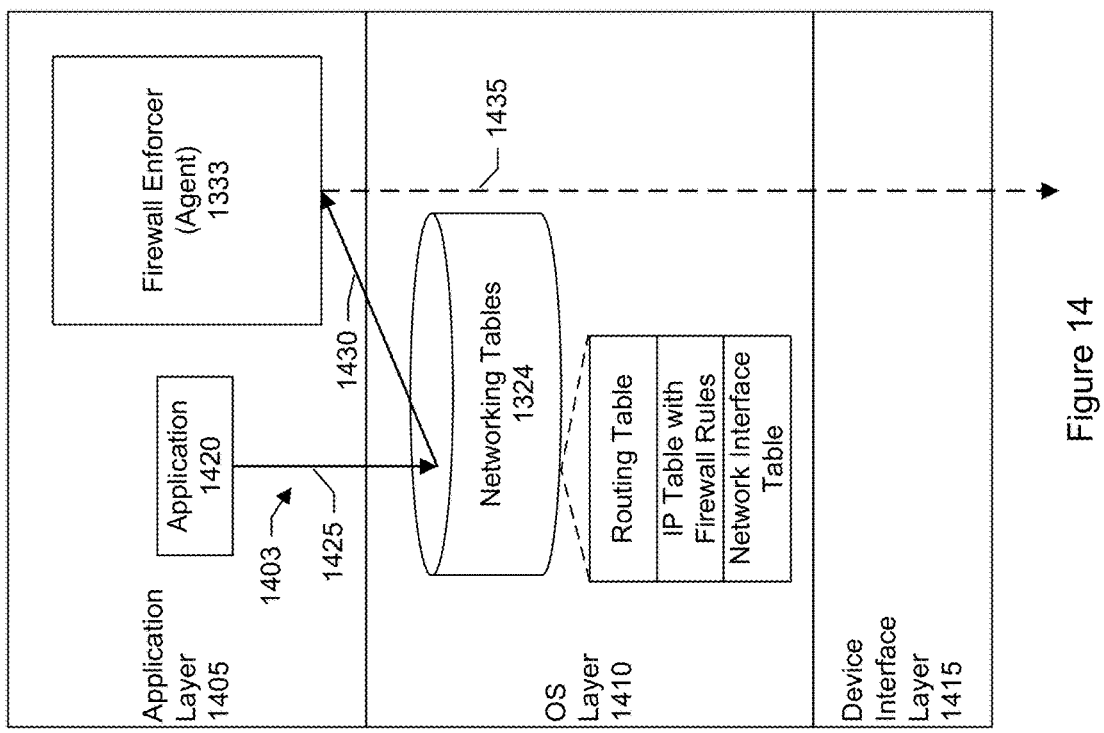
FIG. 14 shows a layer diagram of a packet that may be sent from an endpoint, under some embodiments.

The firewall programmer, upon receipt of the firewall rules from the controller, programs, inserts, or adds firewall rules 1287A to the network kernel so that the firewall rules can be enforced at the endpoint. FIG. 14 shows a layer diagram for enforcement of firewall rules at the endpoint. FIG. 14 shows a path 1403 of a data packet to be potentially sent from the endpoint subject to evaluation of the firewall rules at the endpoint.

As shown in the example of FIG. 14, there is an application layer 1405, operating system layer 1410, and device interface layer 1415. The application layer is above the OS layer. The OS layer is below the application layer. The OS layer is between the application layer and device interface layer. The OS layer is above the device interface layer.

In a specific embodiment, application 1420 passes 1425 the data packet down through the OS network stack. The OS network stack may include routing tables including virtual routing tables, an IP table with the firewall rules, and network interface table. In this specific embodiment, the networking tables are configured to redirect 1430 the data packet to firewall enforcer agent 1333 at the endpoint. The firewall enforcer agent applies or evaluates the firewall rules at the endpoint to determine whether the data packet should or should not be allowed to proceed.

If the data packet is allowed to proceed, the agent passes 1435 the data packet down through the network stack for transmission from the endpoint to the destination. Alternatively, if the data packet should not be allowed to proceed, the data packet may be dropped. The agent may additionally log the denial in a log for further analysis.

For example, there can be a firewall rule that specifies data packets to a particular destination IP address or subnet should be blocked. There can be a firewall rule that specifies data packets to a particular destination port should be blocked. There can be a firewall rule that specifies data packets of a particular protocol should be blocked. And so forth. A data packet whose parameters match values specified in the firewall rules may be blocked. Line 1435 is shown in FIG. 14 using broken lines to indicate that the data packet may be accepted or denied based on the firewall rules evaluation.

Figure 15:
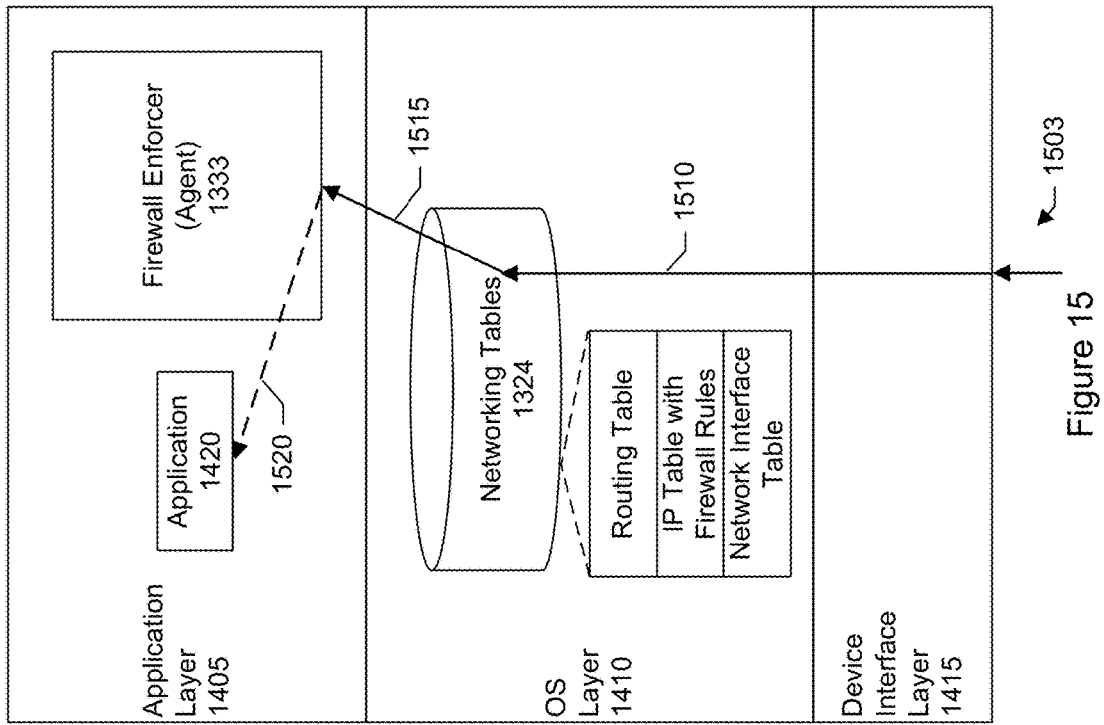
FIG. 15 shows a layer diagram of a packet that may be received at an endpoint, under some embodiments.

FIG. 15 shows a path 1503 of a data packet to be potentially received by the application at the endpoint. As shown in the example of FIG. 15, the data packet is received at the device interface layer and passes 1510 upwards through the network stack. The data packet is redirected to 1515 to the firewall enforcer agent at the endpoint. The firewall enforcer agent applies or evaluates the firewall rules at the endpoint to determine whether the data packet should or should not be allowed to proceed.

If the data packet is allowed to proceed, the agent passes 1520 the data packet to the application. For example, there can be a firewall rule that specifies data packets from a particular source IP address or subnet should be blocked. There can be a firewall rule that specifies data packets from a particular source port should be blocked. There can be a firewall rule that specifies data packets of a particular protocol should be blocked. And so forth. A data packet whose parameters match values specified in the firewall rules may be blocked. Line 1520 is shown in FIG. 15 using broken lines to indicate that the data packet may be accepted or denied based on the firewall rules evaluation.

Referring back now to FIG. 13, the monitor or monitoring unit of the firewall enforcer agent is responsible for monitoring the firewall rules that have been programmed into the networking tables to detect tampering. In a specific embodiment, the monitor stores or maintains in memory at the endpoint a copy or separate copy of the firewall rules 1350 that have been programmed into the networking kernel. The monitor periodically compares the firewall rules programmed into the networking kernel against the in memory copy of the firewall rules to detect discrepancies.

The monitor can further track the frequency or number of times within a particular time period that the firewall rules have been changed. In a specific embodiment, the monitor compares the frequency to a threshold frequency. If the frequency is above the threshold frequency, the monitor generates an alert to the controller.

Figures 16, 17:
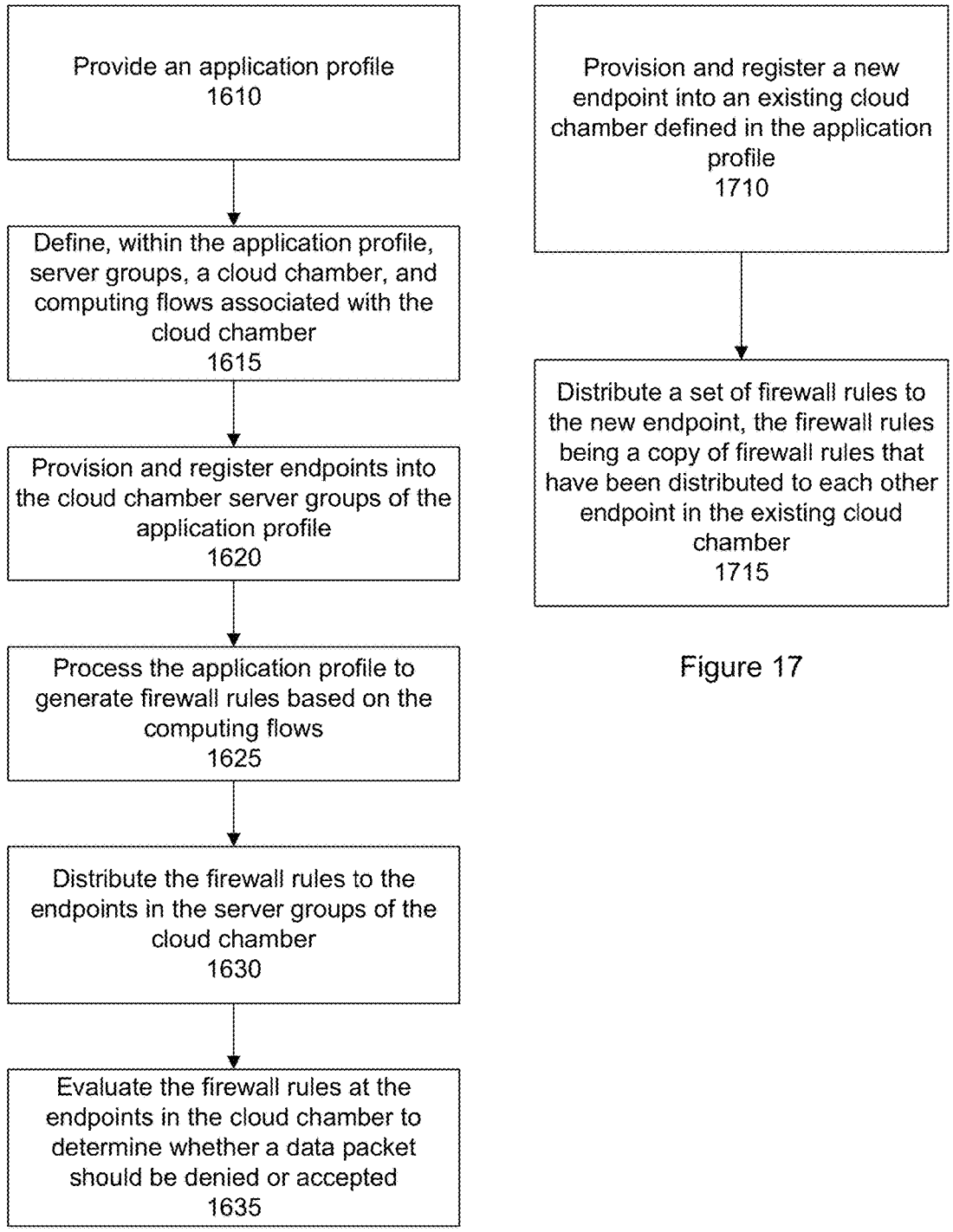
FIG. 16 shows an overall flow diagram of the inter-cloud chamber, under some embodiments.
FIG. 17 shows a flow diagram of adding new endpoints to the inter-cloud chamber, under some embodiments.

FIG. 16 shows an overall flow for the inter-cloud chamber. In a step 1610, an application profile for an application is provided. In a step 1615, a user is allowed to define, within the application profile, server groups, a cloud chamber, and computing flows associated with the cloud chamber. In an embodiment, the system receives, from a user, an identification of a first server group, a second server group, and a cloud chamber as including the first and second server groups, where the first server group is in a first cloud computing network provided by a first cloud provider, and the second server group is in a second cloud computing network provided by a second cloud provider, different from the first cloud provider.

As discussed above, a computing flow may include an inbound computing flow to the cloud chamber. A computing flow may include an outbound computing flow from the cloud chamber. A computing flow may include parameters or attributes such as source IP address, source IP subnet, destination IP address, destination IP subnet, protocol, source port, destination port, an indication as to whether the computing flow should be allowed or denied, or combinations of these.

In a step 1620, endpoints are provisioned and registered into the cloud chamber server groups of the application profile. The provisioning may include, for example, transmitting firewall enforcement agents to the endpoints in the cloud chamber.

In a step 1625, the application profile is processed at the controller to generate firewall rules based on the computing flows.

In a step 1630, the firewall rules are distributed or transmitted from the controller to the endpoints in the server groups of the cloud chamber. As discussed above, in a specific embodiment, each endpoint in a cloud chamber may receive the same set of firewall rules even if the endpoints are in different cloud networks hosted by different cloud providers. In an embodiment, a method includes receiving a data packet at an endpoint among a set of endpoints in a cloud chamber. A first subset of the endpoints are in a first cloud network hosted by a first cloud provider. A second subset of the endpoints are in a second cloud network hosted by a second cloud provider, different from the first cloud provider. The method further includes applying, at the endpoint, a firewall rule to the data packet to determine whether the data packet should be accepted or denied, where the same firewall rule is also at each other endpoint of the first and second subsets of endpoints in the cloud chamber.

A single set of firewall rules can be maintained even though the application may be deployed across two or more cloud networks hosted by different cloud providers. Maintaining a single set of firewall rules per cloud chamber helps to reduce administrative overhead. Consider, as an example, that an existing firewall rule needs to be updated such as by changing a port number, protocol, or other parameter in the existing firewall rule. The update can be performed at the central controller and the updated firewall rule can then be pushed from the controller to each endpoint in the cloud chamber—including endpoints that may be in different cloud networks (though still in the same cloud chamber). An administrator will not have to access the different firewall programming interfaces provided by the different cloud providers to update two different sets of firewall rules in order to make the rules consistent across the endpoints in the different cloud networks.

Likewise, the administrator can build or author a new firewall rule at the central controller and push the new firewall rule to each endpoint in the cloud chamber. Each endpoint in the cloud chamber can receive the same copy of the new firewall rule. For example, with the system, the administrator may decide to block a specific port (e.g., port 256). A firewall rule blocking port 256 may then be pushed to all endpoints in a cloud chamber including endpoints that may be in different cloud computing networks. This helps to reduce the chance of error, such as typographical errors (e.g., typing in port 255 instead of port 256), and helps to ensure consistent firewall rules across endpoints in different cloud networks as the firewall rule can be programmed once or via a single interface for two different cloud networks.

The controller can store master copies of the firewall rules that have been distributed to the various endpoints and cloud chambers. The controller can track which firewall rules have been distributed to which endpoints. This helps to simplify management and maintenance as the administrator can access a single central interface provided by the controller to see which firewall rules have been distributed to which endpoint among a set of endpoints where some endpoints are in one cloud computing network and other endpoints are in another different cloud computing network. If, for example, an existing endpoint (e.g., virtual machine) needs to be restarted, the controller can redistribute the relevant firewall rules to the endpoint once it has restarted.

In a step 1635, the firewall rules are evaluated or applied at the endpoints in the cloud chamber to determine whether a data packet should be denied or accepted. Since the firewall rules are evaluated at the endpoint, there is no need to issue from the endpoint to an edge firewall a request for firewall rule evaluation. This helps to conserve network bandwidth since the network does not have to be traversed for firewall rule evaluations.

FIG. 17 shows a flow of adding a new endpoint. In a step 1710, a new endpoint is provisioned and registered into an existing cloud chamber defined in the application profile. In a step 1715, a set of firewall rules are distributed to the new endpoint, the firewall rules being a copy of firewall rules that have been distributed to each other endpoint in the cloud chamber. In a specific embodiment, the controller maintains copies of the firewall rules that have been distributed to the various endpoints in the various cloud chambers. In this specific embodiment, when a new endpoint is added to an existing cloud chamber, the controller transmits the firewall rules associated with the existing cloud chamber to the newly added endpoint. In other words, the new endpoint may inherit the firewall rules associated with the existing cloud chamber.

Figure 18:
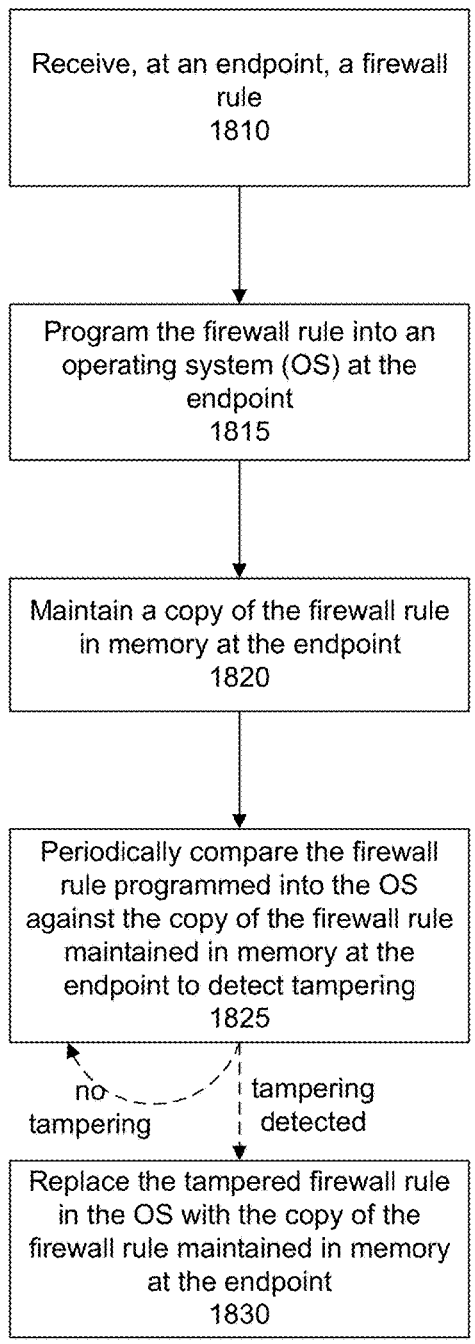
FIG. 18 shows a flow diagram of monitoring firewall rules at the endpoints, under some embodiments.

FIG. 18 shows a flow of monitoring the firewall rules at an endpoint. In a step 1810, an endpoint in the cloud chamber receives from the controller firewall rules. In a step 1815, the agent at the endpoint programs or inserts the firewall rules into the OS at the endpoint. In a step 1820, the agent maintains or stores a separate copy of the firewall rules in memory, e.g., RAM, at the endpoint. In other words, the firewall rules in memory are maintained separate or independent from the firewall rules programmed into the OS. In a step 1825, the agent periodically compares the firewall rules programmed into the OS against the separate copy of the firewall rules stored in the memory to detect tampering or other discrepancies between the firewall rules programmed into the OS and the separate copy of the firewall rules stored in memory. Thus, the separate or independent copy of the firewall rules in memory can be used as a reference or standard to detect tampering or differences with the firewall rules programmed into the OS. The frequency of comparison can be a user-configurable value. For example, an administrator may configure the system to compare once every 1, 2, 3, 4, 5, 6, 7, 8, 9, or 10 seconds.

Discrepancies may include, for example, an unauthorized change to an existing firewall rule, an unauthorized insertion of a firewall rule, an unauthorized deletion of a firewall rule, an unauthorized reordering of rule evaluation, or combinations of these. Unauthorized changes or additions to the firewall rules can refer to changes or additions that do not originate from the controller.

Upon detecting a discrepancy or tampering, the agent undertakes countermeasures. In a specific embodiment, the countermeasures include replacing the tampered firewall rule with the in memory copy (step 1830). In other words, the firewall rules stored in the memory at the endpoint may be copied back into the OS at the endpoint. Thus, even if a hacker or other malicious tool or program is able to gain local access to the endpoint, these countermeasures help to thwart attempts to penetrate other endpoints or make unauthorized connections from the compromised endpoint. These periodic checks of the firewall rules (and subsequent restoration or replacement of the tampered firewall rules with the previous untampered versions) help to secure the system.

In a specific embodiment, the copy of the firewall rules is stored in memory at the endpoint, rather than disk. Storing in memory decreases the risk of the firewall rules copy being compromised because it is much more difficult to hack or gain unauthorized access to memory as compared to disk. In another specific embodiment, the copy of the firewall rules may instead or additionally be stored in disk at the endpoint.

Figure 19:
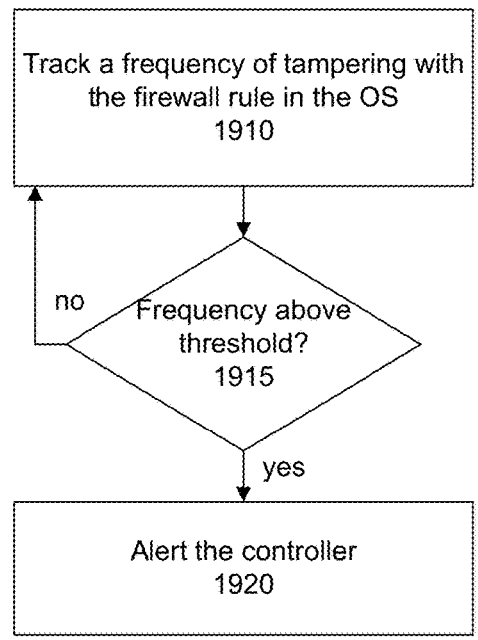
FIG. 19 shows a flow diagram for alerting the controller, under some embodiments.

FIG. 19 shows further detail of a flow for remediation actions or countermeasures when tampering of the firewall rules is detected. In a step 1910, the endpoint agent tracks a frequency of tampering with the firewall rules in the OS. In a step 1915, the tampering frequency is compared against a threshold frequency to determine whether the frequency of tampering is above the threshold. The threshold frequency can be a user-configurable value. If the frequency of tampering is below the threshold, the agent continues to track the frequency (step 1910). Alternatively, if the frequency of tampering is above the threshold, the agent alerts the controller so that further remediation steps can be undertaken (step 1920).

In a specific embodiment, the agent tracks a number of times tampering is detected within a predetermined threshold time period. In an embodiment, the agent maintains a counter variable that represents the number of times tampering has been detected within the threshold time period. When tampering of the firewall rules is detected, the agent increments the counter (and replaces the tampered firewall rules with the copy stored in memory—step 1830, FIG. 18). The agent compares the counter against a predetermined threshold number representing a number of times tampering is "authorized" within the threshold time period. If the counter exceeds the threshold number within the predetermined threshold time period, the endpoint agent alerts the controller. If the counter is below the threshold number within the threshold time period, the endpoint agent does not alert the controller. The agent may reset the counter and timer. The threshold number and time periods can be user-configurable.

Consider, as an example, that the threshold number has been configured to be 15 and the threshold time period has been configured to be 1 minute. In other words, in this example, if the number of times tampering is detected exceeds 15 times within 1 minute, the endpoint agent alerts the controller. If the number of times tampering is detected is below 15 times within 1 minute, the endpoint agent does not alert the controller.

In another specific embodiment, the agent decrements a counter variable that represents the number of times tampering is "authorized" to occur within the threshold time period. When the counter variable reaches zero before the threshold time period has expired or elapsed, the endpoint agent alerts the controller.

Using a rate of tampering to determine whether or not to alert the controller helps to prevent false alarms. For example, during an initial deployment and configuration of the system, things may be constantly changing. It can be very disruptive if these changes result in alerts to the controller and the subsequent quarantining of the endpoint.

Figure 20:
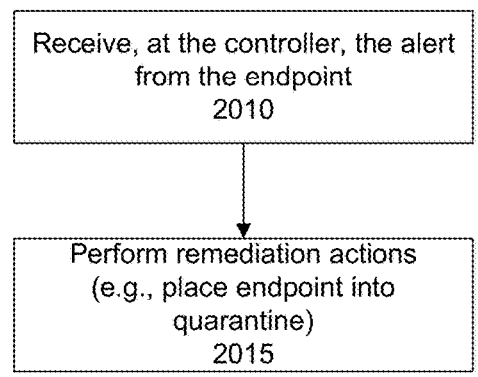
FIG. 20 shows a flow diagram for performing remediation actions, under some embodiments.

FIG. 20 shows a flow of the controller for performing remediation actions. In a step 2010, the controller receives from the endpoint agent an alert. As discussed above, the alert may be triggered based on the number of times tampering of the firewall rules was detected within a particular time period.

In a step 2015, the controller performs one or more remediation actions. Remediation actions may include placing the endpoint onto a quarantine list (e.g., adding an IP address of the endpoint to the quarantine list), alerting an administrator (e.g., sending a text message to the administrator), issuing an instruction from the controller to the endpoint agent to empty or clear the network routing table information so that the endpoint will be unable to make any connections, or combinations of these.

Referring back now to FIG. 4B, in a specific embodiment, the virtual network overlay platform provides for the assignment of virtual IP addresses (also referred to as CoIP addresses) and maintains information mapping the virtual IP addresses to physical IP addresses. These systems and techniques facilitate migration to different networks and facilitate connecting different networks (e.g., connecting first cloud network and a second cloud network, or connecting a cloud network to a private enterprise network) without having to make changes or extensive changes to the underlying infrastructure. Different networks may have different subnet designs, IP address assignment schemes, and so forth. Connecting different networks can involve an extensive reconfiguration of the applications and networks to ensure against IP address conflicts, collisions, and so forth.

In a specific embodiment, endpoints are assigned both physical and virtual IP addresses. The overlay network presents the virtual IP addresses to the applications for the routing of application traffic. When a data packet is to be transmitted, the overlay network can then wrap a data packet (having a virtual IP address) with a corresponding physical IP address destination for the actual physical transmission. Virtual IP addresses can be mapped and remapped to different physical IP addresses. Thus, the network configuration settings for the upper layer applications can remain the same despite migrations to different networks.

Further detailed discussions for connecting different network domains including making wide area network (WAN) connections and local area network (LAN) connections— without having to change or substantially change the underlying networks—are provided in U.S. patent application Ser. No. 14/187,091, filed Feb. 21, 2014, now U.S. Pat. No. 9,525,564, issued Dec. 20, 2016; U.S. patent application Ser. No. 15/396,227, filed Dec. 30, 2016; U.S. patent application Ser. No. 15/442,469, filed Feb. 24, 2017; and U.S. patent application Ser. No. 14/339,259, filed Jul. 23, 2014, which are all incorporated by reference.

These patent applications further describe systems and techniques for ensuring that the connections are allowed and secure. For example, in a specific embodiment, when there is a request to establish a connection from a source endpoint to a destination endpoint, a source agent at the source endpoint performs a preliminary security check to determine whether the destination endpoint that the source endpoint wishes to connect with is in an allowed destination subnet. If the destination falls within the allowed destination subnet, the source endpoint agent issues a request to the controller for the connection. The controller performs a further review of the request that may include, for example, checking the application profile to ensure that the computing flow is permitted, checking various whitelists to ensure that signatures of processes and application components associated with the request to connect are approved, checking a blacklist to ensure that the signatures are not on the blacklist, checking a quarantine list to ensure that the destination endpoint is not listed in the quarantine list, or combinations of these.

If these checks pass, the controller informs the source and destination agents that the connection request is permitted. If, for example, the connection is to be a WAN connection (e.g., source and destination endpoints are remote from each other), the controller instructs the source and destination agents to initiate an outbound connection to a virtual network switch connected between the source and destination networks. A payload from the source endpoint is transmitted to the virtual network switch, extracted at the virtual network switch, and placed into return traffic to the destination endpoint.

If, for example, the connection is to be a LAN connection (e.g., source and destination endpoints are local to each other), the controller informs the destination endpoint that a secure tunnel is to be established from the source endpoint to the destination endpoint and provides the destination endpoint a session identifier to verify the secure tunnel connection.

Firewall rules may be applied at the source endpoint when a data packet is to be sent from the source endpoint to the destination endpoint. Firewall rules may be applied at the destination endpoint upon receipt of the data packet at the destination endpoint. These systems and techniques help to provide a very secure method of data transmission as there are multiple checks throughout the process. For example, in some cases a controller may approve a connection, but a data packet may be dropped based on a firewall rule evaluation if, for example, the destination port specified in the packet is not allowed.

Figure 21:
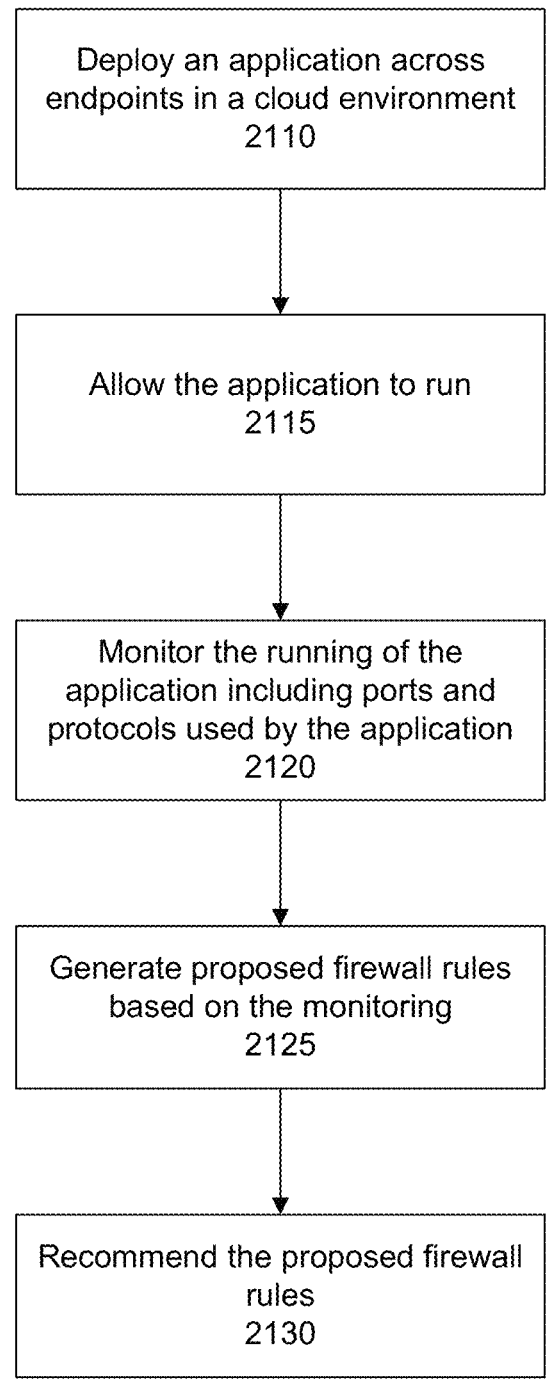
FIG. 21 shows a flow diagram for auto-discovery of an application.

FIG. 21 shows a flow for recommending firewall rules based on auto-discovery of the application. In a step 2110, an application is deployed across endpoints in a cloud computing environment. The endpoints may be in the same or different cloud computing networks. In a step 2115, the application is allowed to run over a period of time (e.g., several hours). The time period can be user-configurable. In a step 2120, the running of the application is monitored such as by endpoint agents that have been provisioned to each of the endpoints. In a specific embodiment, an agent collects or logs information such as identifications of which ports and protocols have been used by the running of the application. The agents transmit the collected information to the controller.

In a step 2125, the controller receives the collected information from the endpoint agents and generates proposed firewall rules based on the monitoring. Consider, as an example, that the collected information indicates that the application uses a specific port and other ports are not used. The controller may then generate proposed firewall rules that allow the specific port to be used and blocks the other ports not typically used by the application.

In a step 2130, the controller provides the administrator with a recommendation of the proposed firewall rules. The administrator can view the proposed firewall rules and, if desired, make changes, e.g., adding a protocol to a proposed firewall rule, deleting a protocol from a proposed firewall rule, adding a port to a proposed firewall rule, deleting a port from a proposed firewall rule, and so forth. Using the controller, the user administrator can then accept the proposed rules (with or without changes). The rules can then be pushed from the controller to each of the endpoints.

In a specific embodiment, the firewall recommendation process is run during an initial deployment of the application. For example, the administrator may deploy, allow the application to run for a short period of time without any firewall rules in place, and instruct the system to monitor the running of the application for generation of the firewall rules. In another specific embodiment, the auto-discovery process may be run as part of an on-going check of the application to ensure that the firewalls are up-to-date. For example, in this specific embodiment, firewall rules may have already been distributed to the endpoints. The administrator can request through the controller a monitoring of the application. The system can then start the monitoring of the application and, based on the monitoring, recommend other new firewall rules, changes to existing firewall rules, or both.

As can be appreciated, there are many aspects and embodiments of the invention. Presented below in example claim format are various embodiments and aspects of the invention.

1. A method comprising: receiving user input comprising an application profile for an application, the application profile specifying a first server group, a second server group, and a computing flow between the first and second server groups, the specified first and second server groups being empty groups without virtual machines having been provisioned into the first and second server groups; receiving user input comprising a selection of at least the first server group to include in a cloud chamber; examining the computing flow in the application profile and determining that a direction of the flow is from the first server group to the second server group; after virtual machines have been provisioned into the first and second server groups, the first and second server groups now having virtual machines, obtaining an Internet Protocol (IP) address assigned to each virtual machine provisioned into the second server group; inserting an IP address assigned to a virtual machine provisioned into the second server group into a firewall rule for a virtual machine provisioned into the first server group; and distributing the firewall rule to the virtual machine provisioned into the first server group.

2. The method of claim 1 wherein the computing flow in the application profile includes an attribute indicating the computing flow as being legal or illegal.

3. The method of claim 1 comprising: storing a security policy, separate from the application profile, the security policy specifying one or more actions to be applied when illegal computing flows are detected; determining that the computing flow is an illegal computing flow; and inserting into the firewall rule the one or more actions to be applied.

4. The method of claim 3 wherein the one or more actions comprises an action to block the illegal computing flow.

5. The method of claim 3 wherein the one or more actions comprises a first action to allow the illegal computing flow, and a second action to log the illegal computing flow.

6. The method of claim 1 comprising: storing a security policy, separate from the application profile, the security policy specifying one or more actions to be applied when a connection matching the computing flow is detected; and providing the one or more actions to a firewall enforcer at the virtual machine provisioned into the first server group.

7. The method of claim 1 wherein the application profile specifies a component having an IP address, the component being provided by a cloud services provider, a computing flow is between the first server group and the component, and the method comprises: inserting the IP address of the component into a second firewall rule for the virtual machine provisioned into the first server group.

8. The method of claim 1 comprising: after the distributing the firewall rule, receiving an indication that a new virtual machine has been provisioned into the second server group; reexamining the computing flow and determining that a direction of the flow is from the first server group to the second server group; obtaining an IP address assigned to the new virtual machine provisioned into the second server group; inserting the IP address assigned to the new virtual machine into a second firewall rule for the virtual machine provisioned into the first server group; and distributing the second firewall rule to the virtual machine provisioned into the first server group.

9. The method of claim 1 comprising: after the distributing the firewall rule, receiving an indication that a virtual machine has been removed from the second server group; updating a firewall rule distributed to the virtual machine provisioned into the first server group to delete a reference to the virtual machine removed from the second server group; and distributing the updated firewall rule to the virtual machine provisioned into the first server group.

10. A method comprising: receiving user input comprising an application profile for an application, the application profile specifying a plurality of server groups, and a plurality of computing flows involving the server groups, the specified server groups being empty groups without virtual machines having been provisioned into the groups; receiving user input comprising a selection of at least a first server group to include in a cloud chamber; examining a first computing flow in the application profile; determining that a direction of the first computing flow is from the first server group to the second server group; determining that a type of the first computing flow is allowed; after virtual machines have been provisioned into the server groups, the server groups now having virtual machines, obtaining an Internet Protocol (IP) address assigned to each virtual machine provisioned into the second server group; inserting an IP address assigned to a virtual machine provisioned into the second server group into a first firewall rule for a virtual machine provisioned into the first server group to indicate that the virtual machine provisioned into the second server group is an allowed destination; examining a second computing flow in the application profile; determining that a direction of the second computing flow is from the first server group to a third server group; determining that a type of the second computing flow is blocked; after virtual machines have been provisioned into the server groups, the server groups now having virtual machines, obtaining an IP address assigned to each virtual machine provisioned into the third server group; and inserting an IP address assigned to a virtual machine provisioned into the third server group into a second firewall rule for the virtual machine provisioned into the first server group to indicate that the virtual machine provisioned into the third server group is a blocked destination.

In a specific embodiment, a method includes providing an application profile to manage security of an application deployed across two or more cloud computing networks; allowing a user to define in the application profile a first server group, a second server group, a cloud chamber as including the first and second server groups, and a computing flow to the cloud chamber; generating a firewall rule based on the computing flow to the cloud chamber; distributing the firewall rule to the first server group of the cloud chamber; and distributing a copy of the firewall rule to the second server group of the cloud chamber, wherein the first server group is in a first cloud computing network of the two or more cloud computing networks, the second server group is in a second cloud computing network of the two or more cloud computing networks, and wherein the first cloud computing network is provided by a first cloud provider, and the second cloud computing network is provided by a second cloud provider, different from the first cloud provider.

The method may include receiving, at a first endpoint in the first server group of the cloud chamber, a first data packet specifying a particular destination port; evaluating the firewall rule distributed to the first server group to determine whether the first data packet should be denied or accepted; receiving, at a second endpoint in the second server group of the cloud chamber, a second data packet specifying the same particular destination port; and evaluating the copy of the firewall rule distributed to the second server group to determine whether the second data packet should be denied or accepted.

The method may include receiving, at a first endpoint in the first server group of the cloud chamber, a first data packet specifying a particular protocol; evaluating the firewall rule distributed to the first server group to determine whether the first data packet should be denied or accepted; receiving, at a second endpoint in the second server group of the cloud chamber, a second data packet specifying the same particular protocol; and evaluating the copy of the firewall rule distributed to the second server group to determine whether the second data packet should be denied or accepted.

The method may include programming the firewall rule distributed to the first server group into an operating system (OS) of an endpoint in the first server group; monitoring the firewall rule programmed into the OS to detect tampering; detecting tampering of the firewall rule programmed into the OS; and upon detecting the tampering, replacing the tampered firewall rule with the firewall rule distributed to the first server group.

The method may include calculating a frequency of the tampering; determining whether the frequency exceeds a threshold frequency; and if the frequency exceeds the threshold frequency, generating an alert to add the endpoint to a listing of quarantined endpoints.

The method may include programming the firewall rule distributed to the first server group into an operating system (OS) of an endpoint in the first server group; making a copy of the firewall rule programmed into the OS; maintaining, in memory at the endpoint, the copy of the firewall rule that was programmed into the OS; periodically comparing the firewall rule programmed into the OS against the copy of the firewall rule maintained in the memory of the endpoint to detect tampering of the firewall rule programmed into the OS; and upon detecting tampering, copying back into the OS the copy of the firewall rule maintained in memory at the endpoint and issuing an alert to a central security controller that is connected with the endpoint.

In an embodiment, the computing flow is a first computing flow and the method includes allowing the user to define in the application profile a second computing flow from the cloud chamber; generating a second firewall rule based on the second computing flow from the cloud chamber; distributing the second firewall rule to the first server group of the cloud chamber; and distributing a copy of the second firewall rule to the second server group of the cloud chamber.

In a specific embodiment, a method includes providing an application profile to manage security of an application deployed across a first cloud computing network, and a second cloud computing network, the first and second cloud computing networks being connected by the Internet; allowing a user to define in the application profile a first server group, a second server group, a cloud chamber as including the first and second server groups, and a computing flow from the cloud chamber; generating a firewall rule based on the computing flow from the cloud chamber; distributing the firewall rule to the first server group of the cloud chamber; and distributing a copy of the firewall rule to the second server group of the cloud chamber, wherein the first server group is in the first cloud computing network, and the first cloud computing network belongs to a first cloud provider, and wherein the second server group is in the second cloud computing network, and the second cloud computing network belongs to a second cloud provider, different from the first cloud provider.

In an embodiment, the firewall rule distributed to the first server group specifies a particular destination Internet Protocol (IP) address, a particular destination port, a particular protocol, and a particular action to be performed when parameters of a data packet to be sent from the first server group matches the particular IP address, destination port, and protocol, and the copy of the firewall rule distributed to the second server group specifies the same particular IP address, destination port, protocol, and action. The first and second cloud computing networks may be remote from each other.

In an embodiment, the firewall rule is received by an agent at an endpoint in the first server group, and the agent programs the firewall rule into an operating system (OS) at the endpoint, maintains a copy of the firewall rule in memory at the endpoint, and monitors the firewall rule programmed into the OS using the copy of the firewall rule maintained in the memory at the endpoint.

In an embodiment, the firewall rule is a first firewall rule and the method includes allowing the user to define in the application profile a second computing flow to the cloud chamber; generating a second firewall rule based on the second computing flow to the cloud chamber; distributing the second firewall rule to the first server group of the cloud chamber; and distributing a copy of the second firewall rule to the second server group of the cloud chamber.

The method may include receiving the firewall rule at an endpoint in the first server group; programming the firewall rule into an operating system (OS) at the endpoint; maintaining, in memory at the endpoint, a copy of the firewall rule programmed into the OS; monitoring the firewall rule programmed into the OS using the copy of the firewall rule maintained in the memory at the endpoint to detect tampering of the firewall rule programmed into the OS; and upon detection of tampering, replacing the tampered firewall rule with the copy of the firewall rule maintained in the memory at the endpoint.

In a specific embodiment, a method includes storing an application profile to manage security of an application deployed across a first cloud computing network, and a second cloud computing network, the first and second cloud computing networks being connected by the Internet; allowing a user to define in the application profile a first server group as being in the first cloud computing network, a second server group as being in the second cloud computing network, a cloud chamber as including the first and second server groups, a first computing flow to the cloud chamber, and a second computing flow from the cloud chamber; generating a first firewall rule based on the first computing flow to the cloud chamber; transmitting the first firewall rule to the first server group; transmitting a copy of the first firewall rule to the second server group; generating a second firewall rule based on the second computing flow from the cloud chamber; transmitting the second firewall rule to the first server group; and transmitting a copy of the second firewall rule to the second server group, wherein the first cloud computing network is owned by a first cloud provider, and the second cloud computing network is owned by a second cloud provider, different from the first cloud provider.

In an embodiment, the first firewall rule is received by an agent at an endpoint in the first server group, and the agent programs the first firewall rule into an operating system (OS) at the endpoint, maintains, in memory at the endpoint, a copy of the first firewall rule programmed into the OS, and upon detecting tampering of the first firewall rule programmed into the OS, replaces the tampered first firewall rule with the copy of the first firewall rule maintained in the memory at the endpoint.

The method may include receiving the first and second firewall rules at an endpoint in the first server group; inserting the first and second firewall rules into an operating system (OS) at the endpoint for enforcement; monitoring the first and second firewall rules inserted into the OS to detect tampering; calculating a frequency of the tampering; determining whether the frequency exceeds a threshold frequency; and if the frequency exceeds the threshold frequency, generating an alert to place the endpoint into quarantine.

In another specific embodiment, there is a system for a distributed firewall security system, the system comprising: a processor-based system executed on a computer system and configured to: store an application profile to manage security of an application deployed across a first cloud computing network, and a second cloud computing network, the first and second cloud computing networks being connected by the Internet; allow a user to define in the application profile a first server group as being in the first cloud computing network, a second server group as being in the second cloud computing network, a cloud chamber as including the first and second server groups, a first computing flow to the cloud chamber, and a second computing flow from the cloud chamber; generate a first firewall rule based on the first computing flow to the cloud chamber; transmit the first firewall rule to the first server group; transmit a copy of the first firewall rule to the second server group; generate a second firewall rule based on the second computing flow from the cloud chamber; transmit the second firewall rule to the first server group; and transmit a copy of the second firewall rule to the second server group, wherein the first cloud computing network is owned by a first cloud provider, and the second cloud computing network is owned by a second cloud provider, different from the first cloud provider.

In another specific embodiment, there is a computer program product, comprising a non-transitory computer-readable medium having a computer-readable program code embodied therein, the computer-readable program code adapted to be executed by one or more processors to implement a method comprising: storing an application profile to manage security of an application deployed across a first cloud computing network, and a second cloud computing network, the first and second cloud computing networks being connected by the Internet; allowing a user to define in the application profile a first server group as being in the first cloud computing network, a second server group as being in the second cloud computing network, a cloud chamber as including the first and second server groups, a first computing flow to the cloud chamber, and a second computing flow from the cloud chamber; generating a first firewall rule based on the first computing flow to the cloud chamber; transmitting the first firewall rule to the first server group; transmitting a copy of the first firewall rule to the second server group; generating a second firewall rule based on the second computing flow from the cloud chamber; transmitting the second firewall rule to the first server group; and transmitting a copy of the second firewall rule to the second server group, wherein the first cloud computing network is owned by a first cloud provider, and the second cloud computing network is owned by a second cloud provider, different from the first cloud provider.

In another specific embodiment, there is a method for transmitting code for use in a distributed firewall security system on a transmission medium, the method comprising transmitting code for storing an application profile to manage security of an application deployed across a first cloud computing network, and a second cloud computing network, the first and second cloud computing networks being connected by the Internet; transmitting code for allowing a user to define in the application profile a first server group as being in the first cloud computing network, a second server group as being in the second cloud computing network, a cloud chamber as including the first and second server groups, a first computing flow to the cloud chamber, and a second computing flow from the cloud chamber; transmitting code for generating a first firewall rule based on the first computing flow to the cloud chamber; transmitting code for transmitting the first firewall rule to the first server group; transmitting code for transmitting a copy of the first firewall rule to the second server group; transmitting code for generating a second firewall rule based on the second computing flow from the cloud chamber; transmitting code for transmitting the second firewall rule to the first server group; and transmitting code for transmitting a copy of the second firewall rule to the second server group, wherein the first cloud computing network is owned by a first cloud provider, and the second cloud computing network is owned by a second cloud provider, different from the first cloud provider.

In a specific embodiment, an edge gateway or edge gateway system is provided that addresses next-generation firewall use cases on the overlay network edge. This edge gateway system provides, among other things, 1) Traffic direction control between the L5 network and L3 network; 2) Cloud chamber (e.g., zChamber) setup on the network edge device; 3) L3-to-L5 destination NAT and reverse NAT support (one-to-many); and 4) Auto discovery and policy enforcement on the network edge device.

In this specific embodiment, the four features above are based on the edge gateway device (which may be referred to as the Zentera Edge Gateway device) being designed, configured, or used as an overlay firewall that provides application traffic isolation and filtering between L5 networks (i.e., CoIP or virtual IP) and L3 networks (i.e., IP networks). The four features address four different aspects of the overlay firewall.

The first feature (traffic direction control between the L5 network and L3 network) defines the security rules in terms of direction control for the L5-L3 traffics. The traffic direction control allows the user to specify edge gateway traffic flow direction including the inbound direction towards the physical network world, the outbound direction towards the overlay world (and return traffic is allowed), or both regardless what type or protocols the traffics are actually using. This capability allows the enterprise to define the overlay networks as a secured area or vice versa for the IP networks.

An example or use case for the overlay network includes protecting a secured e-Commerce application running on an overlay network in a public cloud datacenter. Another example includes protecting the corporate IP network against external deployed applications for reverse access for any traffic on the data plane. After the traffic by the direction is specified, the benefit of the direction control can allow the user to secure the application going into or out of the secure networks. The technique can easily prevent data leaks, block malicious penetrations into the secured networks, or both. Compared to the traditional L3 edge firewall between network regions, this technique can apply to the routing layer and avoid the highly mixed and overly complex firewall rules programmed in a traditional firewall.

As discussed above, in an embodiment, the cloud chamber (e.g., zChamber) is an overlay firewall system. In an embodiment, the cloud chamber (e.g., zChamber) extends to cover multi-cloud environments, which further simplifies the traditional region firewall programming and maintenance. The extended chamber can cross cloud boundaries and facilitates a single unified policy enforcement end-to-end over multiple clouds. Today's firewall rules are static, distributed, spread among multiple firewall devices over geographic locations, and separately configured depending upon the particular cloud provider. In a dynamic cloud environment, the enterprise security policy stays static, but these firewall rules need to be dynamically updated to support the security requirement that the compute workloads are elastically provisioned and may migrate within the cloud networks. The chamber consolidates the security requirements in a next-generation, complex multi-cloud environment. In an embodiment, the security policy is static and defines how a cloud application is supposed to conduct its client-server communication securely. In an embodiment, the security rules for the chamber overlay firewall system are all dynamically generated, updated, and enforced end-to-end. The cloud chamber (e.g., zChamber) supports one policy across clouds.

In a specific embodiment, the NAT function enables and protects devices provisioned behind an edge gateway for access by consolidating the access addresses to a single IP address. It also simplifies the network address requirements via this process. These systems and techniques define a L5-to-L3 NAT function and also a L3-to-L5 NAT function.

These NAT functions help to simplify the IP address assignment in the L5 network, L3 network, or both when designing the application communications between L5 and L3 networks. It also helps to enhance the security by hiding the backend IP addresses from "external" access. Another benefit achieved includes allowing such an edge gateway deployment in a public IaaS cloud. Many of today's IaaS cloud do not offer rich physical network functions such as IP address assignment. The IaaS cloud network typically does not allow users to provision additional IP addresses without instantiating real and matching cloud instances. The underlying routing layer simply does not route these IP addresses. It can be very challenging for enterprise users to implement an overlay network in the cloud using the conventional IP forwarding technology. Provided are systems and techniques for NAT to help solve this problem in any cloud.

The L5-to-L3 edge gateway is an important device to connect the application traffic and is security sensitive. When the operation team deploys applications to the cloud, one challenge to both the InfoSec security team and the operation team includes the knowledge gap between application function and security policy. It can be very challenge to set up the right or appropriate security policy (and the rules) on a per application basis. A key benefit of application auto discovery includes helping to explore all application network ports and addresses that are required to support the respective applications using this edge gateway. After discovery, the application software, traffics, ports and addresses can be reviewed by both the InfoSec and operation teams and subsequently locked down as part of the security rules and policy enforcement. The discovery results in application interlock onto the edge gateway, and thus achieves CoIP network interlock with application through edge gateway. When the operation team revises the version of the applications, such an automatic discovery process can be easily executed again and enforcement turned on or activated.

These four features can be combined so that the CoIP network will include a secured one policy overlay network which runs on and without touching or substantially changing the underlay network and many under-layer static firewall devices. In an embodiment, an overlay infrastructure is provided for traffic isolation which will allow telecommunication companies (telcos), cloud service providers, and others to build managed services.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
providing an application profile to manage security of an application deployed across two or more cloud computing networks;
allowing a user to define in the application profile a first server group, a second server group, a cloud chamber as including the first and second server groups, and a computing flow to the cloud chamber;
generating a firewall rule based on the computing flow to the cloud chamber;
distributing the firewall rule to the first server group of the cloud chamber; and
distributing a copy of the firewall rule to the second server group of the cloud chamber, wherein the first server group is in a first cloud computing network of the two or more cloud computing networks, the second server group is in a second cloud computing network of the two or more cloud computing networks, and
wherein the first cloud computing network is provided by a first cloud provider, and the second cloud computing network is provided by a second cloud provider, different from the first cloud provider.

2. The method of claim 1 comprising:
receiving, at a first endpoint in the first server group of the cloud chamber, a first data packet specifying a particular destination port;
evaluating the firewall rule distributed to the first server group to determine whether the first data packet should be denied or accepted;
receiving, at a second endpoint in the second server group of the cloud chamber, a second data packet specifying the same particular destination port; and
evaluating the copy of the firewall rule distributed to the second server group to determine whether the second data packet should be denied or accepted.

3. The method of claim 1 comprising:
receiving, at a first endpoint in the first server group of the cloud chamber, a first data packet specifying a particular protocol;
evaluating the firewall rule distributed to the first server group to determine whether the first data packet should be denied or accepted;
receiving, at a second endpoint in the second server group of the cloud chamber, a second data packet specifying the same particular protocol; and
evaluating the copy of the firewall rule distributed to the second server group to determine whether the second data packet should be denied or accepted.

4. The method of claim 1 comprising:
programming the firewall rule distributed to the first server group into an operating system (OS) of an endpoint in the first server group;
monitoring the firewall rule programmed into the OS to detect tampering;
detecting tampering of the firewall rule programmed into the OS; and
upon detecting the tampering, replacing the tampered firewall rule with the firewall rule distributed to the first server group.

5. The method of claim 4 comprising:
calculating a frequency of the tampering;
determining whether the frequency exceeds a threshold frequency; and
if the frequency exceeds the threshold frequency, generating an alert to add the endpoint to a listing of quarantined endpoints.

6. The method of claim 1 comprising:
programming the firewall rule distributed to the first server group into an operating system (OS) of an endpoint in the first server group;
maintaining, in memory at the endpoint, a separate copy of the firewall rule that was programmed into the OS;

periodically comparing the firewall rule programmed into the OS against the separate copy of the firewall rule maintained in the memory of the endpoint to detect tampering of the firewall rule programmed into the OS; and upon detecting tampering, copying back into the OS the separate copy of the firewall rule maintained in memory at the endpoint, and issuing an alert to a central security controller that is connected with the endpoint.

7. The method of claim 1 wherein the computing flow is a first computing flow and the method comprises:

allowing the user to define in the application profile a second computing flow from the cloud chamber;

generating a second firewall rule based on the second computing flow from the cloud chamber;

distributing the second firewall rule to the first server group of the cloud chamber; and distributing a copy of the second firewall rule to the second server group of the cloud chamber.

8. A method comprising:

providing an application profile to manage security of an application deployed across a first cloud computing network, and a second cloud computing network, the first and second cloud computing networks being connected by the Internet;

allowing a user to define in the application profile a first server group, a second server group, a cloud chamber as including the first and second server groups, and a computing flow from the cloud chamber;

generating a firewall rule based on the computing flow from the cloud chamber;

distributing the firewall rule to the first server group of the cloud chamber; and distributing a copy of the firewall rule to the second server group of the cloud chamber, wherein the first server group is in the first cloud computing network, and the first cloud computing network belongs to a first cloud provider, and wherein the second server group is in the second cloud computing network, and the second cloud computing network belongs to a second cloud provider, different from the first cloud provider.

9. The method of claim 8 wherein the firewall rule distributed to the first server group specifies a particular destination Internet Protocol (IP) address, a particular destination port, a particular protocol, and a particular action to be performed when parameters of a data packet to be sent from the first server group matches the particular destination IP address, particular destination port, and particular protocol, and wherein the copy of the firewall rule distributed to the second server group specifies the same particular destination IP address, particular destination port, particular protocol, and particular action.

10. The method of claim 8 wherein the first and second cloud computing networks are remote from each other.

11. The method of claim 8 wherein the firewall rule is received by an agent at an endpoint in the first server group, and wherein the agent programs the firewall rule into an operating system (OS) at the endpoint, maintains a separate copy of the firewall rule in memory at the endpoint, and monitors the firewall rule programmed into the OS using the separate copy of the firewall rule maintained in the memory at the endpoint.

12. The method of claim 8 wherein the firewall rule is a first firewall rule and the method comprises:

allowing the user to define in the application profile a second computing flow to the cloud chamber;

generating a second firewall rule based on the second computing flow to the cloud chamber;

distributing the second firewall rule to the first server group of the cloud chamber; and distributing a copy of the second firewall rule to the second server group of the cloud chamber.

13. The method of claim 8 comprising:

receiving the firewall rule at an endpoint in the first server group;

programming the firewall rule into an operating system (OS) at the endpoint;

maintaining, in memory at the endpoint, an independent copy of the firewall rule programmed into the OS;

monitoring the firewall rule programmed into the OS using the independent copy of the firewall rule maintained in the memory at the endpoint to detect tampering of the firewall rule programmed into the OS; and upon detection of tampering, replacing the tampered firewall rule with the independent copy of the firewall rule maintained in the memory at the endpoint.

14. A method comprising:

storing an application profile to manage security of an application deployed across a first cloud computing network, and a second cloud computing network, the first and second cloud computing networks being connected by the Internet;

allowing a user to define in the application profile a first server group as being in the first cloud computing network, a second server group as being in the second cloud computing network, a cloud chamber as including the first and second server groups, a first computing flow to the cloud chamber, and a second computing flow from the cloud chamber;

generating a first firewall rule based on the first computing flow to the cloud chamber;

transmitting the first firewall rule to the first server group;

transmitting a copy of the first firewall rule to the second server group;

generating a second firewall rule based on the second computing flow from the cloud chamber;

transmitting the second firewall rule to the first server group; and transmitting a copy of the second firewall rule to the second server group, wherein the first cloud computing network is owned by a first cloud provider, and the second cloud computing network is owned by a second cloud provider, different from the first cloud provider.

15. The method of claim 14 wherein the first firewall rule is received by an agent at an endpoint in the first server group, and wherein the agent programs the first firewall rule into an operating system (OS) at the endpoint, maintains, in memory at the endpoint, a copy of the first firewall rule programmed into the OS, and upon detecting tampering of the first firewall rule programmed into the OS, replaces the tampered first firewall rule with the copy of the first firewall rule maintained in the memory at the endpoint.

16. The method of claim 14 comprising:

receiving the first and second firewall rules at an endpoint in the first server group;

inserting the first and second firewall rules into an operating system (OS) at the endpoint for enforcement;

monitoring the first and second firewall rules inserted into the OS to detect tampering;

calculating a frequency of the tampering;
determining whether the frequency exceeds a threshold frequency; and
if the frequency exceeds the threshold frequency, generating an alert to place the endpoint into quarantine.

* * * * *